United States Patent
Bourbonnais et al.

(10) Patent No.: US 9,882,980 B2
(45) Date of Patent: **\*Jan. 30, 2018**

(54) MANAGING CONTINUOUS PRIORITY WORKLOAD AVAILABILITY AND GENERAL WORKLOAD AVAILABILITY BETWEEN SITES AT UNLIMITED DISTANCES FOR PRODUCTS AND SERVICES

(71) Applicant: International Business Machines Corporation, Armonk, NY (US)

(72) Inventors: Serge Bourbonnais, Palo Alto, CA (US); Paul M. Cadarette, Hemet, CA (US); Michael G. Fitzpatrick, Raleigh, NC (US); David B. Petersen, Gaithersburg, MD (US); Gregory W. Vance, Morgan Hill, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 569 days.

This patent is subject to a terminal disclaimer.

(21) Appl. No.: 14/059,691

(22) Filed: Oct. 22, 2013

(65) Prior Publication Data

US 2015/0113537 A1 Apr. 23, 2015

(51) Int. Cl.
*G06F 9/46* (2006.01)
*H04L 29/08* (2006.01)
(Continued)

(52) U.S. Cl.
CPC ........ *H04L 67/1095* (2013.01); *G06F 9/5083* (2013.01); *G06F 11/16* (2013.01);
(Continued)

(58) Field of Classification Search
CPC ............. H04L 67/1095; H04L 43/0805; G06F 9/5083; G06F 11/16; G06F 17/30371; G06F 17/30575
See application file for complete search history.

(56) References Cited

U.S. PATENT DOCUMENTS

| 6,226,651 B1 | 5/2001 | Masuda et al. |
| 7,383,463 B2 | 6/2008 | Hayden et al. |

(Continued)

FOREIGN PATENT DOCUMENTS

| EP | 1003117 A3 | 5/2000 |
| EP | 1686478 A2 | 8/2006 |

OTHER PUBLICATIONS

Caraman et al., "Continuous Disaster Tolerance in the IaaS Clouds", IEEE, 2012, pp. 1226-1232.
(Continued)

*Primary Examiner* — James J Lee
(74) *Attorney, Agent, or Firm* — Cantor Colburn LLP; William A. Kinnaman, Jr.

(57) ABSTRACT

A system for providing reliable availability of a general workload and continuous availability of a priority workload over long distances may include a first computing site configured to execute a first instance associated with the priority workload, wherein the first instance is designated as an active instance, a second computing site configured to execute a second instance of the priority workload, wherein the second instance is designated as a standby instance, a third computing site configured to restart a third instance associated with the general workload, and a workload availability module configured to synchronize a portion of data associated with the third instance with a corresponding portion of data associated with the second instance.

14 Claims, 15 Drawing Sheets

(51) Int. Cl.
*G06F 9/50* (2006.01)
*G06F 11/16* (2006.01)
*G06F 17/30* (2006.01)
*H04L 12/26* (2006.01)

(52) U.S. Cl.
CPC .. *G06F 17/30371* (2013.01); *G06F 17/30575* (2013.01); *H04L 43/0805* (2013.01)

(56) References Cited

U.S. PATENT DOCUMENTS

| | | | |
|---|---|---|---|
| 7,392,421 | B1 | 6/2008 | Bloomstein et al. |
| 7,426,652 | B2 | 9/2008 | Liccione et al. |
| 7,475,207 | B2 | 1/2009 | Bromling et al. |
| 7,702,791 | B2 * | 4/2010 | Halpern ............ H04L 29/06 709/227 |
| 8,135,981 | B1 | 3/2012 | Gawali et al. |
| 8,156,195 | B2 | 4/2012 | Hagglund et al. |
| 8,161,318 | B2 | 4/2012 | D'Souza et al. |
| 8,429,341 | B2 | 4/2013 | Kazar et al. |
| 8,433,848 | B1 | 4/2013 | Naamad et al. |
| 8,566,318 | B1 | 10/2013 | Sacco |
| 2004/0127999 | A1 | 7/2004 | Murase et al. |
| 2004/0268175 | A1 | 12/2004 | Koch et al. |
| 2005/0165925 | A1 | 7/2005 | Dan et al. |
| 2005/0229021 | A1 | 10/2005 | Lubbers et al. |
| 2005/0256826 | A1 * | 11/2005 | Hambrick ............ G06F 9/485 |
| 2005/0267929 | A1 | 12/2005 | Kitamura |
| 2006/0020640 | A1 | 1/2006 | Suzuki et al. |
| 2007/0195692 | A1 * | 8/2007 | Hagglund .......... G06F 11/2058 370/216 |
| 2008/0189712 | A1 | 8/2008 | Boris |
| 2008/0215909 | A1 * | 9/2008 | Bretschneider ..... G06F 11/1474 714/3 |
| 2008/0250215 | A1 | 10/2008 | Shitomi |
| 2009/0157699 | A1 | 6/2009 | Ohata et al. |
| 2009/0228676 | A1 | 9/2009 | Naganuma et al. |
| 2010/0023564 | A1 | 1/2010 | Yerneni et al. |
| 2011/0099146 | A1 | 4/2011 | McAlister et al. |
| 2012/0221521 | A1 | 8/2012 | Chiu et al. |
| 2012/0253733 | A1 | 10/2012 | Gawande et al. |
| 2012/0259968 | A1 | 10/2012 | Anaya et al. |
| 2012/0260256 | A1 | 10/2012 | De Faria et al. |
| 2012/0303791 | A1 * | 11/2012 | Calder ................ H04L 67/1002 709/224 |
| 2012/0324183 | A1 | 12/2012 | Chiruvolu et al. |
| 2013/0007506 | A1 | 1/2013 | Jain et al. |
| 2013/0073513 | A1 * | 3/2013 | Kemper ............ G06F 17/30587 707/600 |
| 2013/0152097 | A1 | 6/2013 | Boctor et al. |
| 2013/0185716 | A1 | 7/2013 | Yin et al. |
| 2013/0311835 | A1 | 11/2013 | Dunne et al. |
| 2013/0318221 | A1 | 11/2013 | Anaya et al. |
| 2014/0081916 | A1 | 3/2014 | McAlister et al. |
| 2014/0359243 | A1 | 12/2014 | Byrd et al. |
| 2015/0112931 | A1 | 4/2015 | Bourbonnais et al. |
| 2015/0113537 | A1 | 4/2015 | Bourbonnais et al. |
| 2015/0363276 | A1 | 12/2015 | Banerjee et al. |

OTHER PUBLICATIONS

Rajagopalan et al., "Second Site: Disaster Tolerance as a Service", ACM, 2012, pp. 97-107.
Ramesh, "Business Continuity Planning", Tata Consultancy Services, Jul. 2002, pp. 1-32.
Wood et al., "Disaster Recovery as a Cloud Service: Economic Benefits & Deployment Challenges", USENIX, 2010, pp. 1-7.
Daniele Sciascia et al., "Geo-replicated storage with scalable deferred update replication", IEEE, 2013, 9 1-12.
J. Grov et al.. "A Pragmatic Protocal for database Replication in Interconnected Clusters", 12th Pacific Rim international Symposium on Dependable Computing (PRDC'06), 2006, pp. 01-8.

* cited by examiner

MANAGING CONTINUOUS PRIORITY WORKLOAD AVAILABILITY AND GENERAL WORKLOAD AVAILABILITY BETWEEN SITES AT UNLIMITED DISTANCES FOR PRODUCTS AND SERVICES

BACKGROUND

The present invention relates to continuous availability between sites at unlimited distances, and more specifically, to the management and synchronization of all workloads in a multisite continuous workload availability computing environment.

The present invention relates to continuous availability between sites at unlimited distances, and more specifically, to maintaining a two-site configuration in a multisite continuous availability computing environment.

In the past, some computer availability and disaster recovery solutions were limited to a maximum distance between sites. Other past solutions required starting systems, applications, and supporting infrastructure on the backup site that could in some cases take several hours to restart. Some past solutions additionally required modifications to software applications, such as database servers, and hardware, such as routers and switches, in order to implement various disaster recovery and continuous availability functions, resulting in relatively high implementation cost. Some past solutions operated at a site level, rather than at a workload level.

These issues have been substantially addressed by continuous availability solutions between sites at unlimited distances. However, when a primary or secondary continuous availability computer processing site becomes unavailable, for example, due to an unplanned outage or during planned maintenance at one of the sites, the remaining site may run in a single-site configuration, without continuous workload availability, throughout the duration of the primary or secondary site unavailability, until such time as the site becomes available once again. This scenario may expose some workloads to a higher level of risk during a substantial period of time.

In addition, some solutions provide continuous workload availability only with regard to routable, online transaction processing (OLTP) applications and related data objects. Non-OLTP workloads, or "batch" workloads, may not be supported. In some cases, unsupported workloads may target the same data objects as supported workloads. However, a period of unavailability of a primary site may result in the loss or unavailability of data related to unsupported workloads, such as intermediate data files and job scheduler states. In addition, data related to unsupported workloads may be inconsistent with duplicate data related to supported workloads.

SUMMARY

According to one embodiment of the present invention, a system for providing reliable availability of a general workload and continuous availability of a priority workload over long distances includes a first computing site configured to execute a first instance associated with the priority workload, wherein the first instance is designated as an active instance, a second computing site configured to execute a second instance of the priority workload, wherein the second instance is designated as a standby instance, a third computing site configured to restart a third instance associated with the general workload, and a workload availability module configured to synchronize a portion of data associated with the third instance with a corresponding portion of data associated with the second instance.

According to another embodiment of the present invention, a computer program product for providing reliable availability of a general workload and continuous availability of a priority workload over long distances includes a computer readable storage medium having stored thereon first program instructions executable by a processor to cause the processor to assign a first instance associated with the priority workload to a first computing site, wherein the first instance is designated as an active instance, second program instructions executable by the processor to cause the processor to assign a second instance associated with the priority workload to a second computing site, wherein the second instance is designated as a standby instance, third program instructions executable by the processor to cause the processor to restart a third instance associated with the general workload, and fourth program instructions executable by the processor to cause the processor to synchronize a portion of data associated with the third instance with a corresponding portion of data associated with the second instance.

According to yet another embodiment of the present invention, a method for providing reliable availability of a general workload and continuous availability of a priority workload over long distances includes executing a first instance associated with the priority workload at least in part with a first processor, wherein the first instance is designated as an active instance, executing a second instance associated with the priority workload at least in part with a second processor, wherein the second instance is designated as a standby instance, restarting a third instance associated with the general workload at least in part with a third processor, and synchronizing a portion of data associated with the third instance with a corresponding portion of data associated with the second instance.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

Figure 6A:
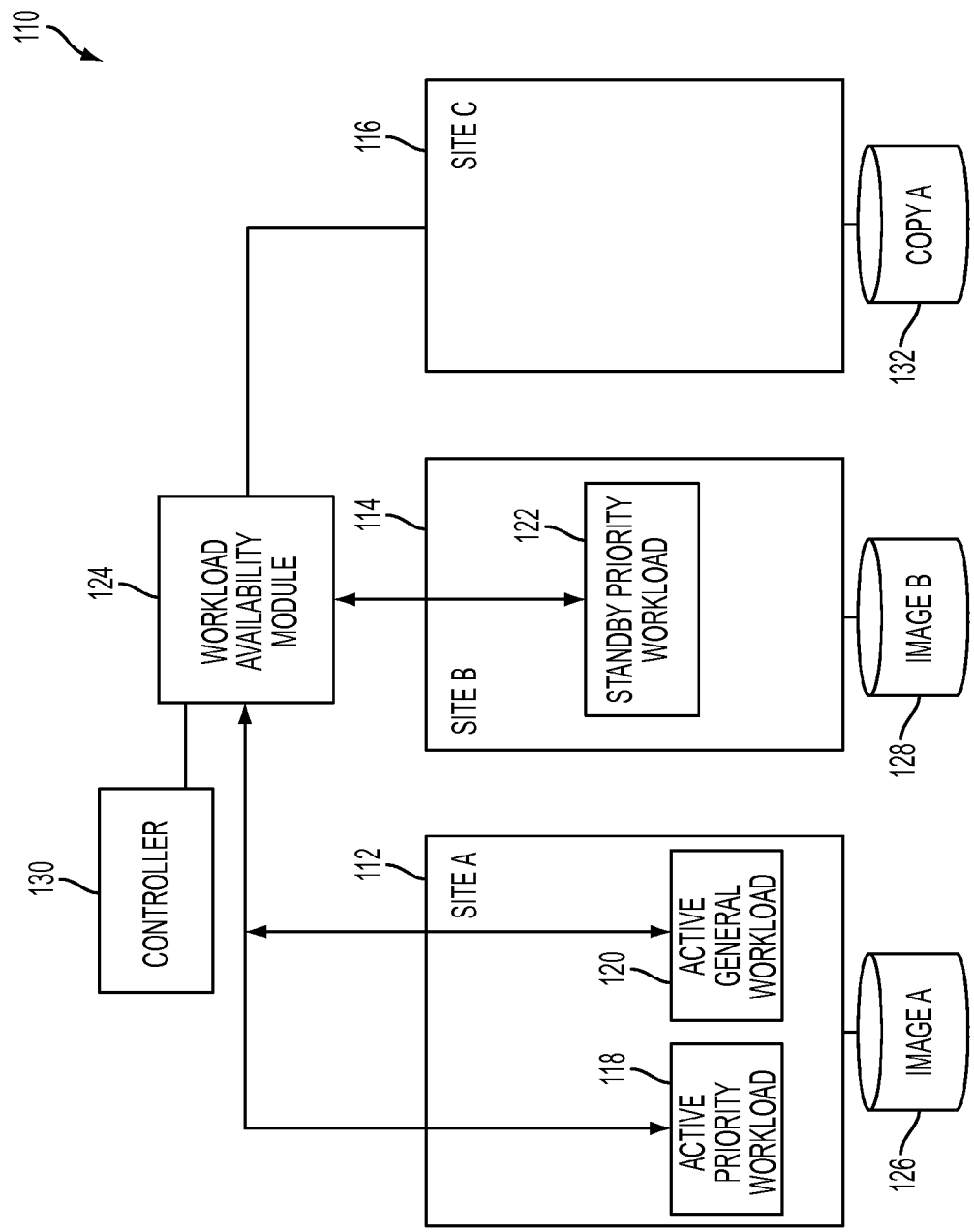
FIG. 6A is a schematic diagram that illustrates a multisite, multi-workload configuration of an integral continuous/ reliable availability system in accordance with an embodiment of the present invention.
Figure 6B:
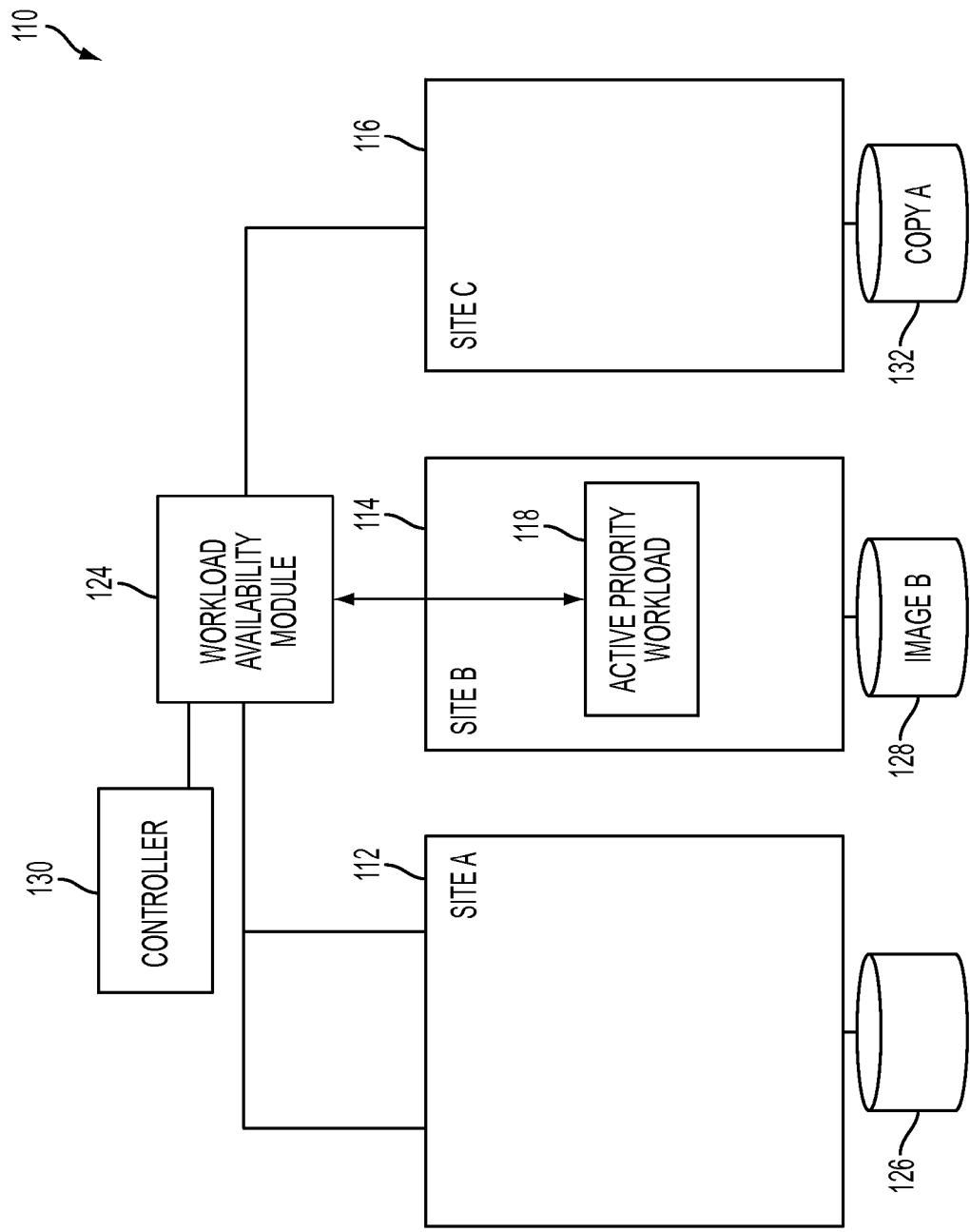

FIG. 6B is a schematic diagram that illustrates another multisite, multi-workload configuration of an integral continuous/reliable availability system in accordance with an embodiment of the present invention.

Figure 6C:
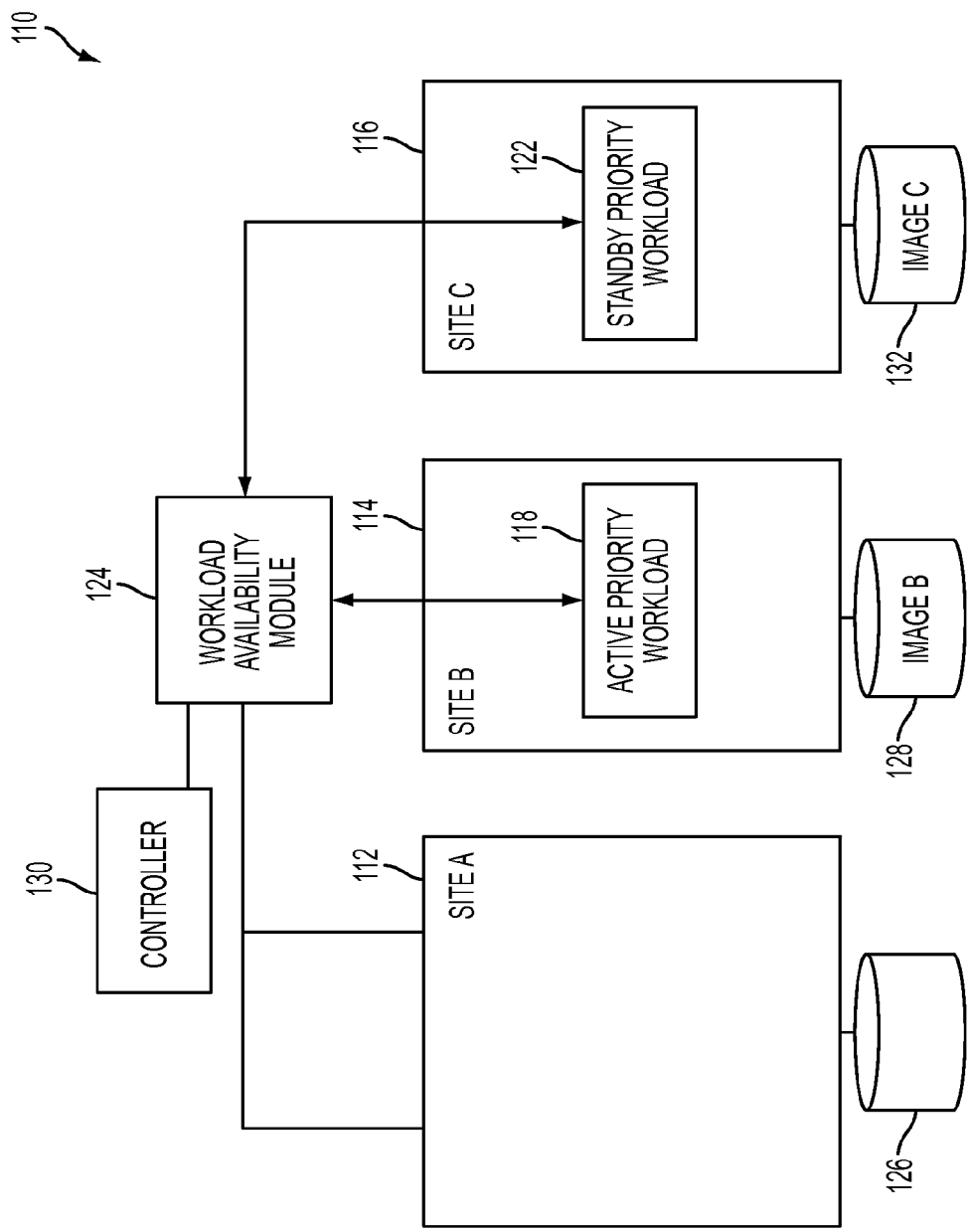

FIG. 6C is a schematic diagram that illustrates yet another multisite, multi-workload configuration of an integral continuous/reliable availability system in accordance with an embodiment of the present invention.

Figure 6D:
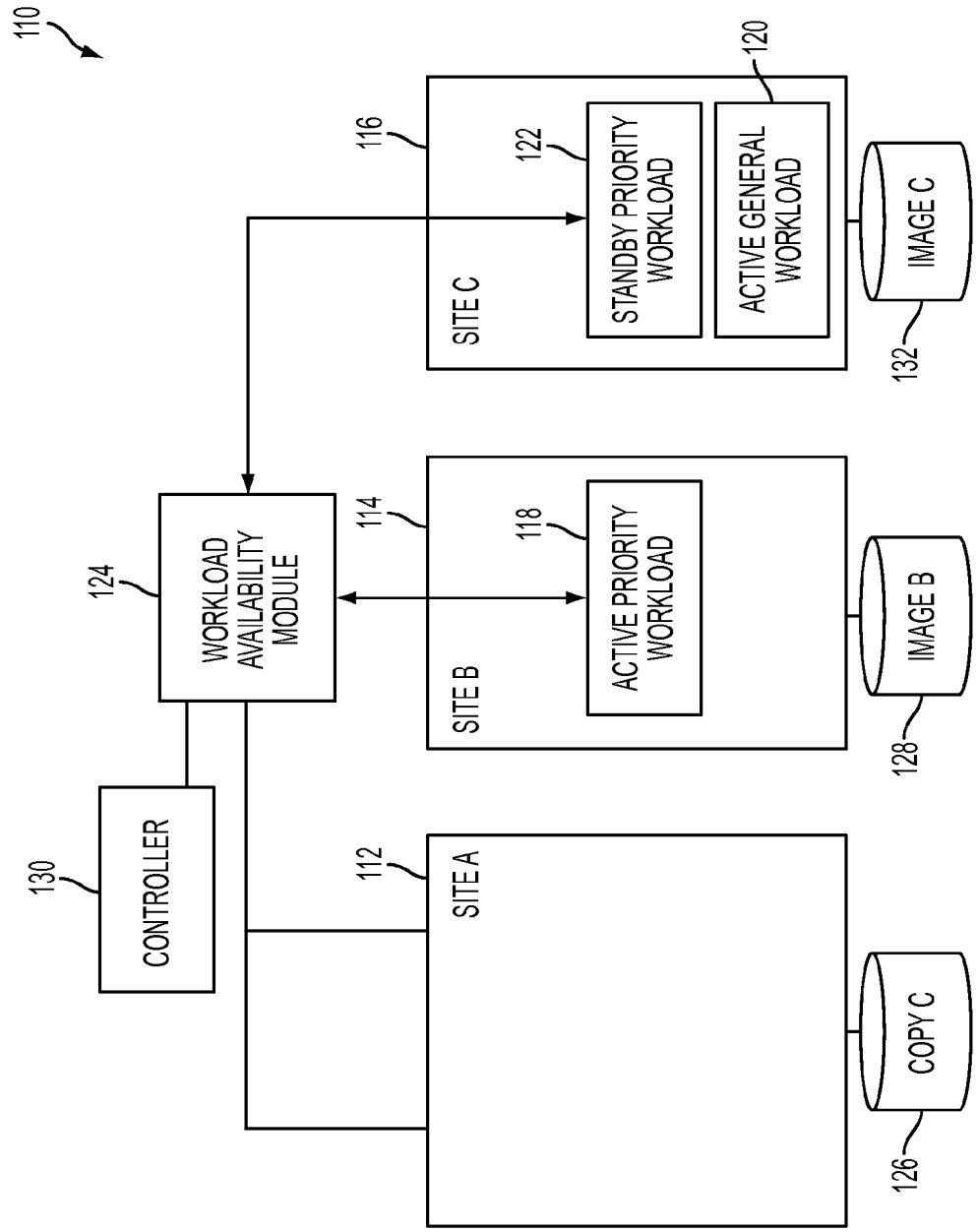

FIG. 6D is a schematic diagram that illustrates yet another multisite, multi-workload configuration of an integral continuous/reliable availability system in accordance with an embodiment of the present invention.

Figure 6E:
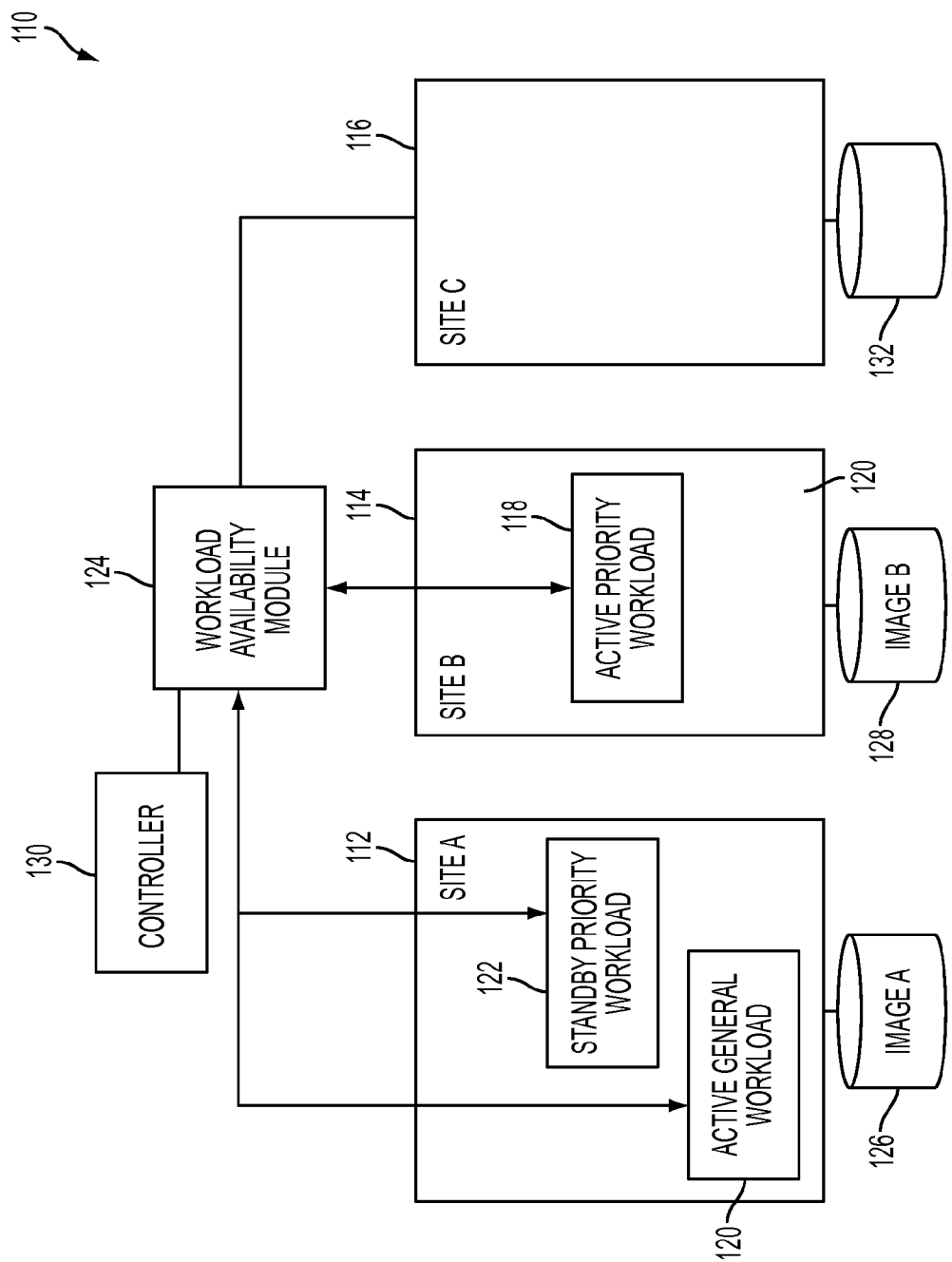

FIG. 6E is a schematic diagram that illustrates yet another multisite, multi-workload configuration of an integral continuous/reliable availability system in accordance with an embodiment of the present invention.

Figure 7:
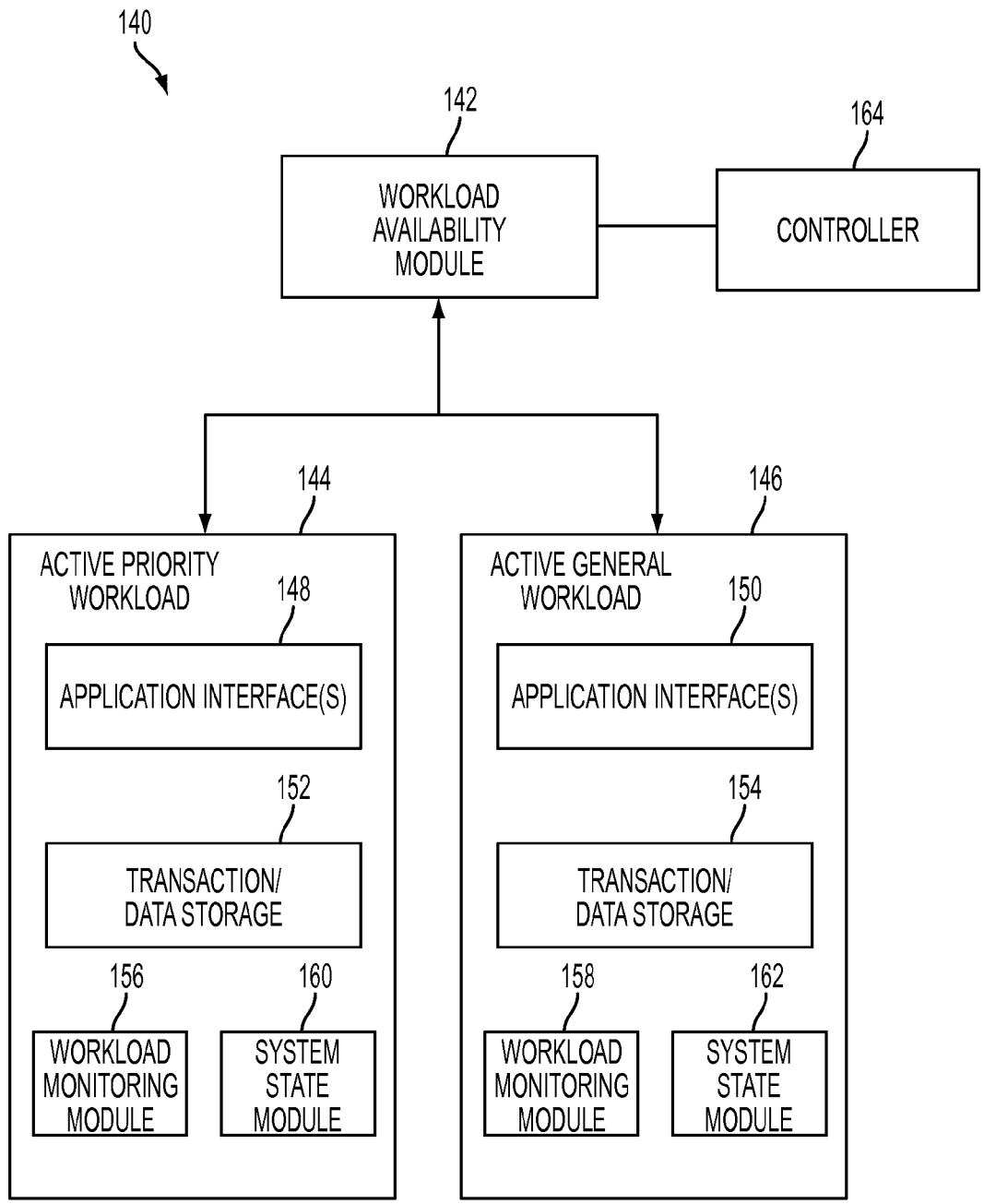

FIG. 7 illustrates a schematic diagram of an individual site implementation of an integral continuous/reliable availability system in accordance with an embodiment of the present invention.

Figure 8:
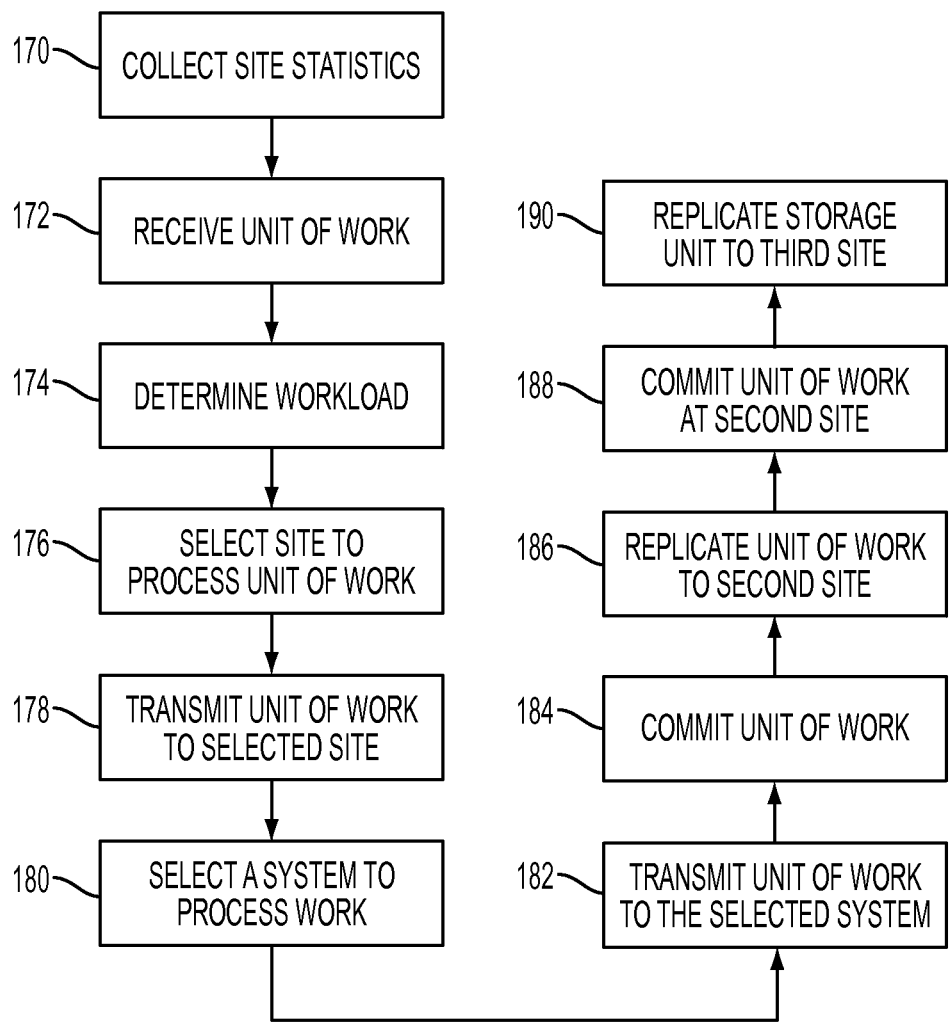

FIG. 8 illustrates a process flow for providing integral continuous/reliable availability in accordance with an embodiment of the present invention.

Figure 9:
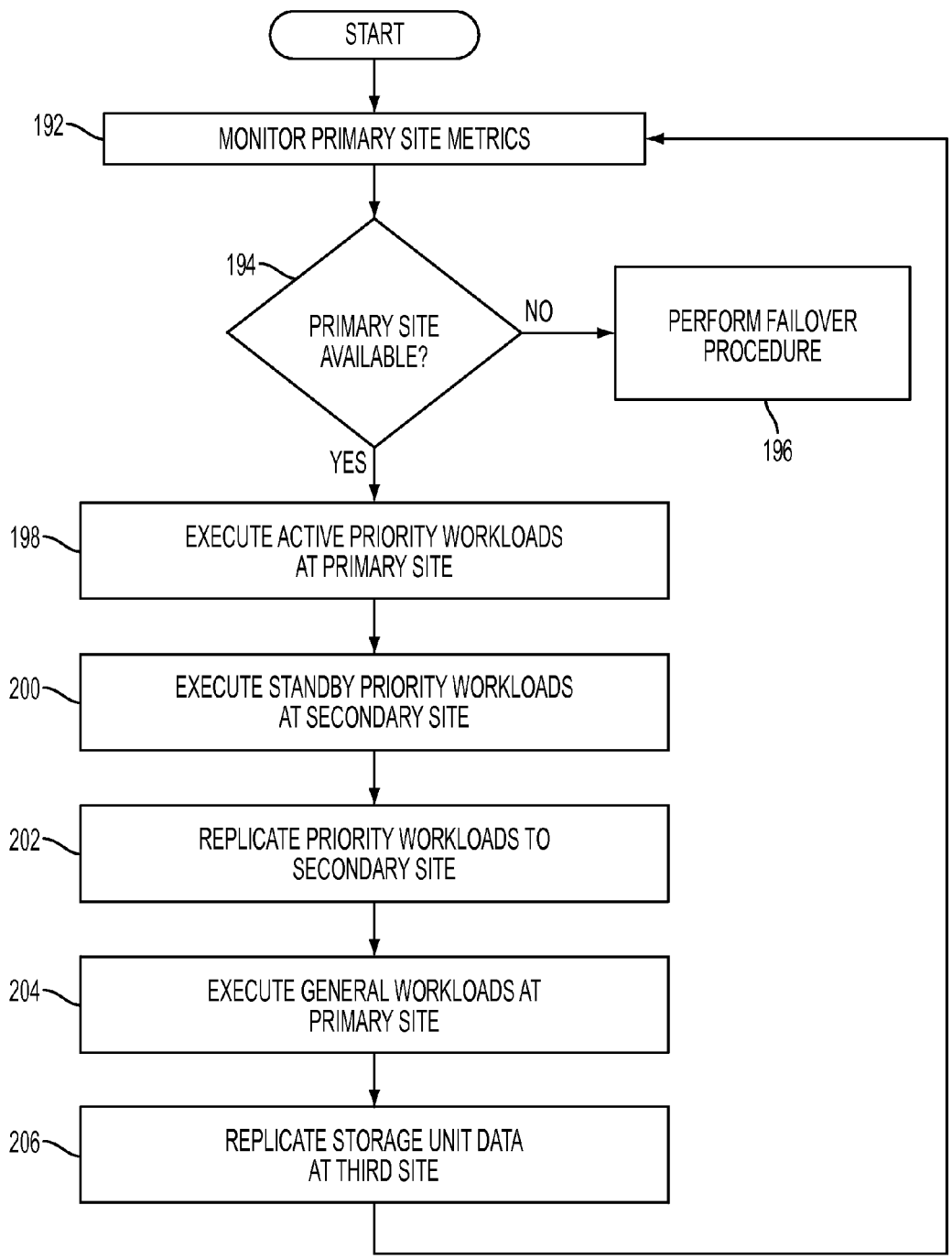

FIG. 9 illustrates another process flow for providing integral continuous/reliable availability in accordance with an embodiment of the present invention.

Figure 10:
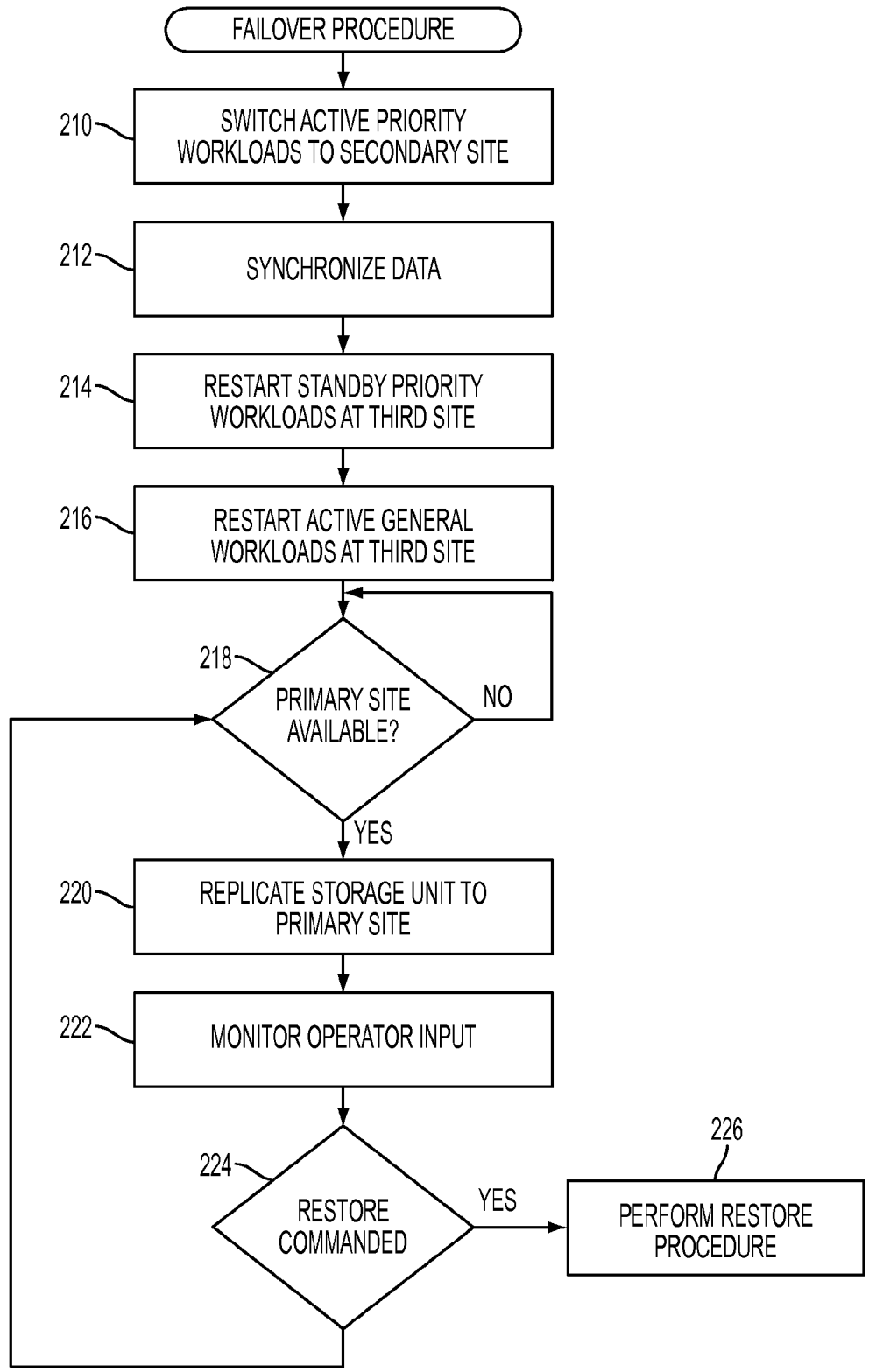

FIG. 10 illustrates a process flow for a failover procedure in accordance with an embodiment of the present invention.

Figure 11:
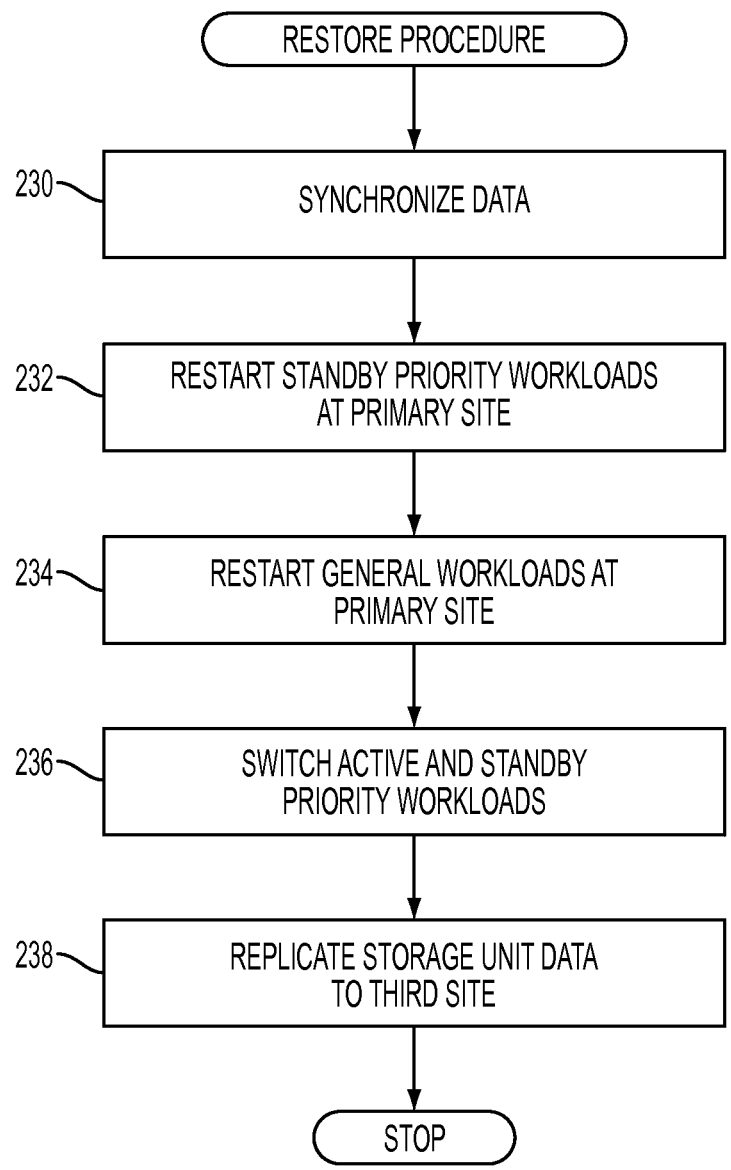

FIG. 11 illustrates a process flow for a restore procedure in accordance with an embodiment of the present invention.

DETAILED DESCRIPTION

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
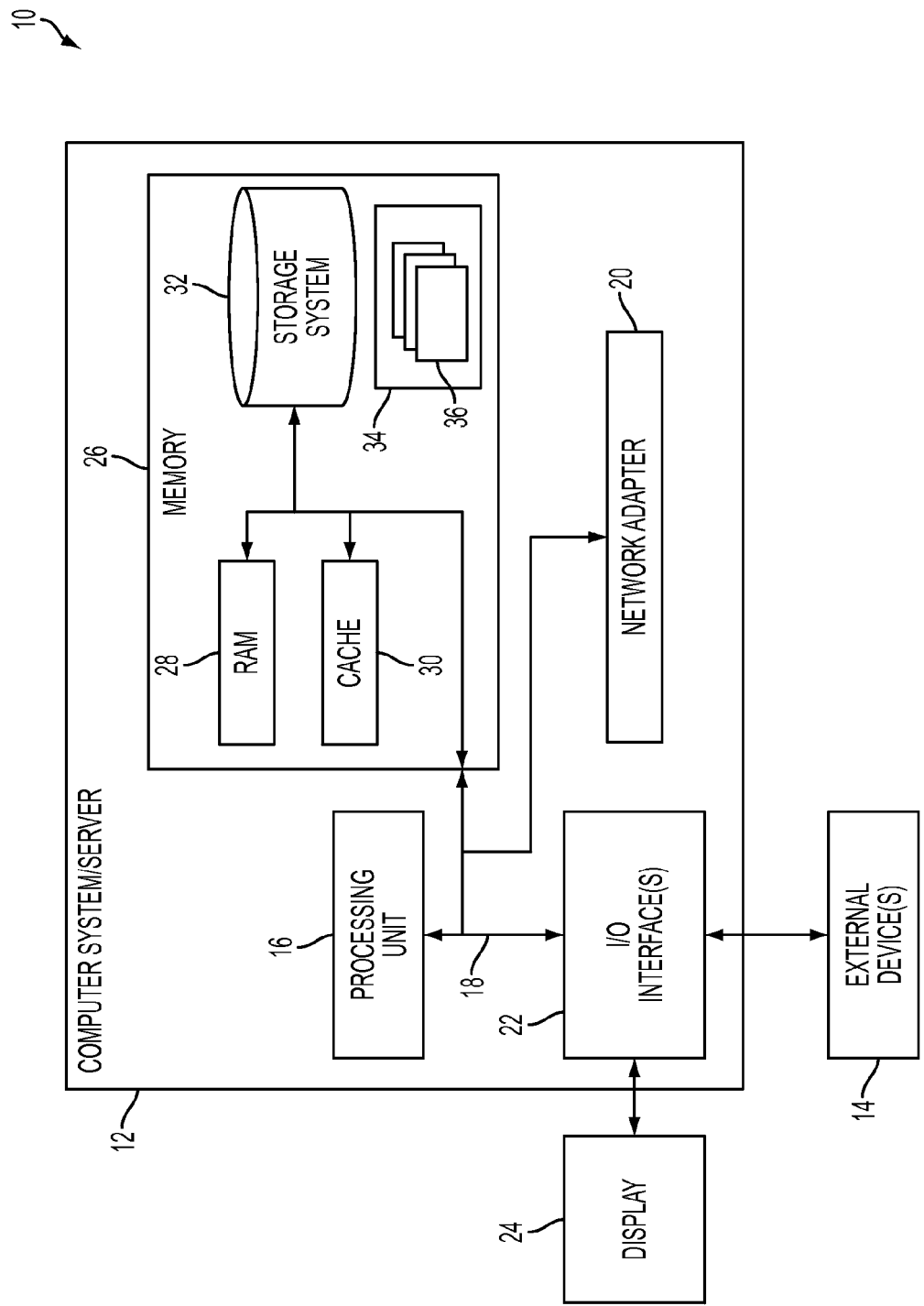
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 26, and a bus 18 that couples various system components including system memory 26 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 26 can include computer system readable media in the form of volatile memory, such as random access memory (RAM) 28 and/or cache memory 30. Computer system/server 12 may further include other removable/non-removable, volatile/non-volatile computer system storage media. By way of example only, storage system 32 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 26 may include at least one program product having a set (e.g., at least one) of program modules that are configured to carry out the functions of embodiments of the invention.

Program/utility 34, having a set (at least one) of program modules 36, may be stored in memory 26 by way of example, and not limitation, as well as an operating system, one or more application programs, other program modules, and program data. Each of the operating system, one or more application programs, other program modules, and program data or some combination thereof, may include an implementation of a networking environment. Program modules 36 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
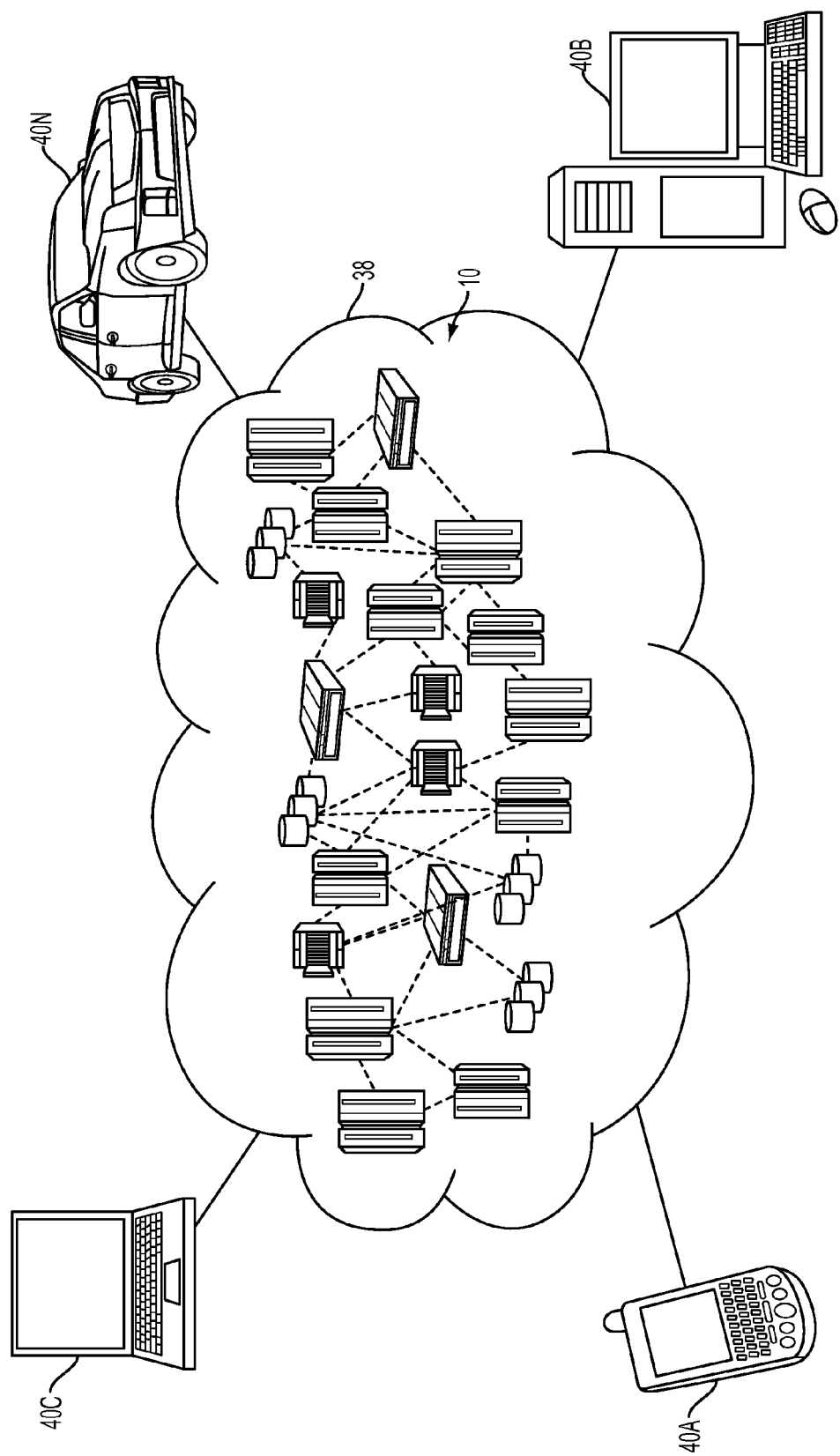
FIG. 2 depicts a cloud computing environment according to an embodiment of the present invention.

Referring now to FIG. 2, illustrative cloud computing environment 38 is depicted. As shown, cloud computing environment 38 comprises one or more cloud computing nodes 10 with which local computing devices used by cloud consumers, such as, for example, personal digital assistant (PDA) or cellular telephone 40A, desktop computer 40B, laptop computer 40C, and/or automobile computer system 40N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 38 to offer infrastructure, platforms and/or software as services for which a cloud consumer does not need to maintain resources on a local computing device. It is understood that the types of computing devices 40A-N shown in FIG. 2 are intended to be illustrative only and that computing nodes 10 and cloud computing environment 38 can communicate with any type of computerized device over any type of network and/or network addressable connection (e.g., using a web browser).

Figure 3:
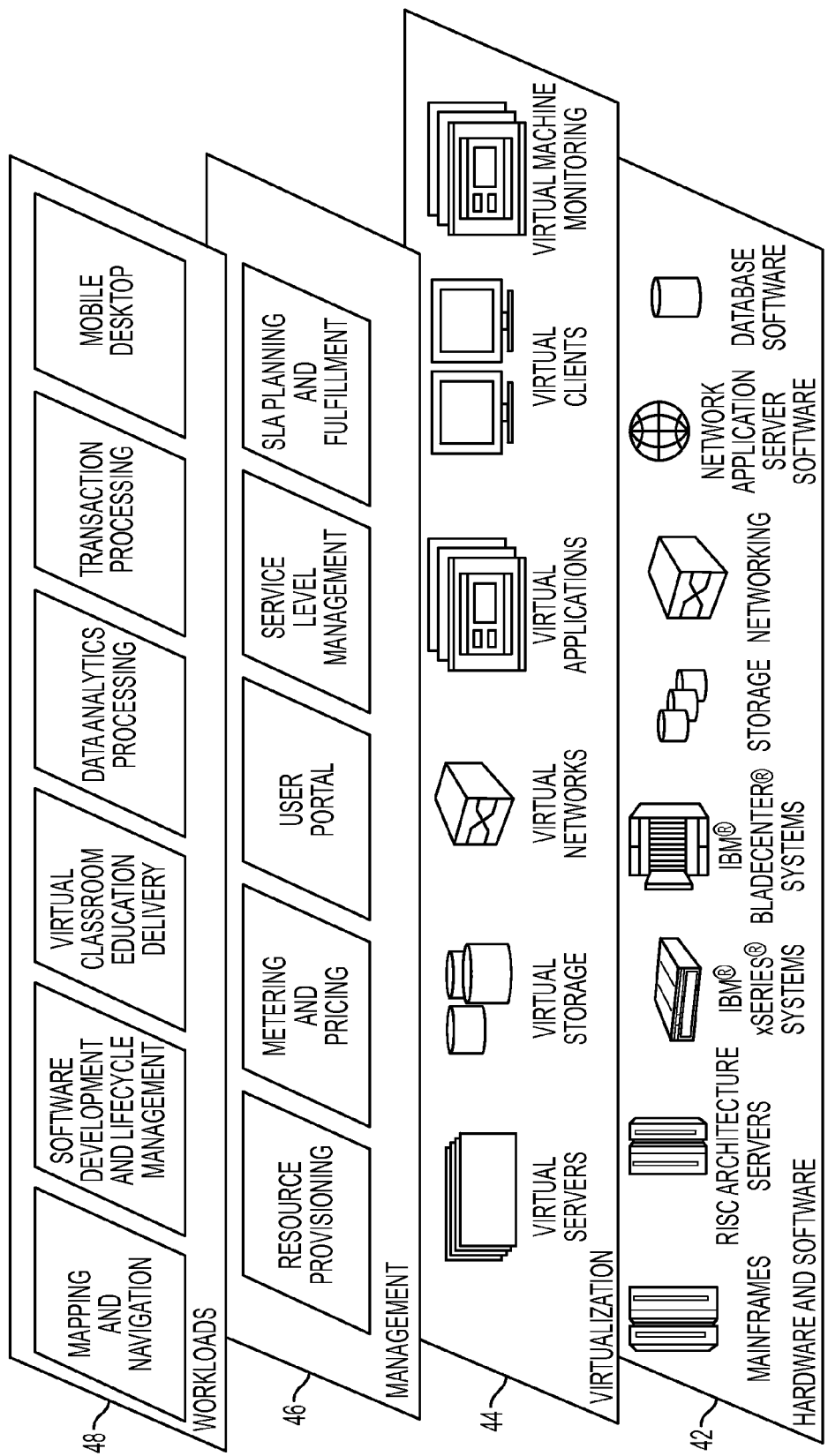
FIG. 3 depicts abstraction model layers according to an embodiment of the present invention.

Referring now to FIG. 3, a set of functional abstraction layers provided by cloud computing environment 38 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 42 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 44 provides an abstraction layer from which the following examples of virtual entities may be provided: virtual servers; virtual storage; virtual networks, including virtual private networks; virtual applications and operating systems; and virtual clients.

In one example, management layer 46 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 48 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

With regard to the resource provisioning and service level management functions of the management layer 46, an embodiment of the present invention may provide continuous availability of priority workloads, reliable availability of general workloads, disaster recovery, workload distribution and replication of application data across a plurality of sites at unlimited distances.

Some existing availability systems are limited geographically and/or by recovery time. When one or more workloads are spread across multiple servers in a single location, the servers for each workload may share a single data repository, and all data related to each of workloads may be stored in the same location. When the workloads are split among geographically dispersed data centers, a single data repository for each workload is not always feasible.

In these instances, data from the one or more workloads may be stored in a data repository at a primary site, and the data may be synchronized, bit-by-bit, between the primary site and a copy of the data at the secondary site. The time that it takes to synchronize the databases is called latency. As sites are spread further apart geographically, latency may increase because of the time it takes to move the data over a network in order to synchronize it. Once latency increases beyond a relatively small amount of time, transferring data between data centers requires increasingly longer periods of time to achieve synchronization.

As a result, some existing availability systems provide acceptable workload performance only within a limited geographic area. In some cases, this limited geographic area may be approximately 10 to 20 fiber kilometers (i.e., 10 to 20 linear kilometers of a fiber optic network).

Disaster recovery systems are designed to switch between a primary data center and a backup data center in situations where the primary data center becomes unavailable, such as, for example, during a power outage. For example, during normal operation all transactions may be distributed to the primary data center and the data may be periodically replicated bit-by-bit to the secondary site or sites.

Priority workloads generally may be executed in parallel on at least two distinct computing systems. Typically, at least two instances of a priority workload may be executed virtually simultaneously on at least two geographically dispersed computing systems, for example, an active instance executing on a computing system at a primary site and a standby instance executing on another computing system at a secondary site. Such a configuration may sometimes be referred to in the art as an "active/active" workload. General workloads, such as batch application workloads, workloads that do not log data, workloads that use sequential files, flat files, or other non-logged data objects, or the like, on the other hand, typically may be executed on only one computing system at a single location, for example, an active instance executing on a computing system at a primary site. Such a configuration may sometimes be referred to in the art as a "non-active/active" workload.

Some clients require continuous availability for priority workloads and reliable availability for general workloads. In addition, some clients require that disaster recovery systems be performed at a workload level. Furthermore, some clients require that availability system sites be separated by relatively long distances. Thus, an integrated availability solution is required that may provide continuous availability at a workload level for priority workloads, as well as reliable availability for general workloads, between multiple sites separated by relatively long distances.

In an embodiment of the present invention, an integrated continuous/reliable availability system may include a software replication module and a hardware replication module. The software replication module may provide unit of work-based software replication methods for one or more priority workloads, and the hardware replication module may provide storage unit-based, managed hardware replication methods for one or more storage units across multiple sites separated by relatively long distances. The integrated continuous/reliable availability system may not require modification to existing user applications.

In any embodiment of the present invention, the distance between sites may include, for example, distances greater than the area covered within a metro area network (MAN), that is, a network that may span distances measured in tens of kilometers, for example, up to about 20 fiber kilometers. Some customers require that a primary site and a secondary redirection site be separated by distances sufficient to ensure that a disaster affecting one site is not likely to affect the other. Although these distances vary based on regional and environmental conditions, primary and secondary sites sometimes are separated by distances that extend beyond a MAN. In various embodiments, the distance between sites may include, for example, distances greater than 50 fiber kilometers, distances greater than 100 fiber kilometers, or distances greater than 1,000 fiber kilometers.

In some embodiments, the customer acceptability window may be measured by the length of the RPO. For example, in an embodiment, the customer acceptable window requires an RPO of less than 3 seconds of data loss when an unplanned interruption occurs.

In any embodiment of the invention, the software replication methods may support continuous availability, workload distribution, replication and services for multiple priority workloads executing on multiple computing systems at multiple individual site locations separated by an unlimited geographic area, and may provide minimal downtime or nearly instantaneous priority workload redirection, such as, for example, within less than 3 seconds, at a common point in time consistency for priority workload data. In combination, the hardware replication methods may support reliable availability, workload distribution and replication services for multiple general workloads executing on multiple computing systems at multiple individual site locations separated by an unlimited geographic area, and may provide minimal-downtime data synchronization and workload redirections, such as, for example, within less than one hour, for general workload data.

A workload may consist of one or more computing applications or jobs, as well as associated middleware runtime environments, data source objects used by the applications, and the network addressability of the applications. A priority workload may consist of one or more computing applications, jobs or threads that are relatively time-sensitive and preferably will not be suspended for more than a brief moment, such as, for example, less than five seconds, even in the event of an emergency or unplanned failure. A general workload may consist of one or more computing applications, jobs or threads that are less time-sensitive and may be suspended for more than a brief moment, and preferably as long as approximately one hour, in the event of an emergency or unplanned failure.

A unit of work may include one or more computing transactions and/or processes substantially performed as a group to service one or more requests. A unit of work data may include, for example, data generated by or otherwise associated with a single computing transaction and/or process, or with multiple computing transactions and/or processes substantially performed as a group to service one or more requests. A data object may include, for example, any combination of related or associated data.

In an embodiment, the integrated continuous/reliable availability system may include a workload distribution module that collects metrics at the software application, middleware, operating system, network, and hardware levels for each workload. The integrated continuous/reliable availability system and may use the collected metrics to provide continuous availability and workload redirection capabilities across multiple computing sites.

Figure 4:
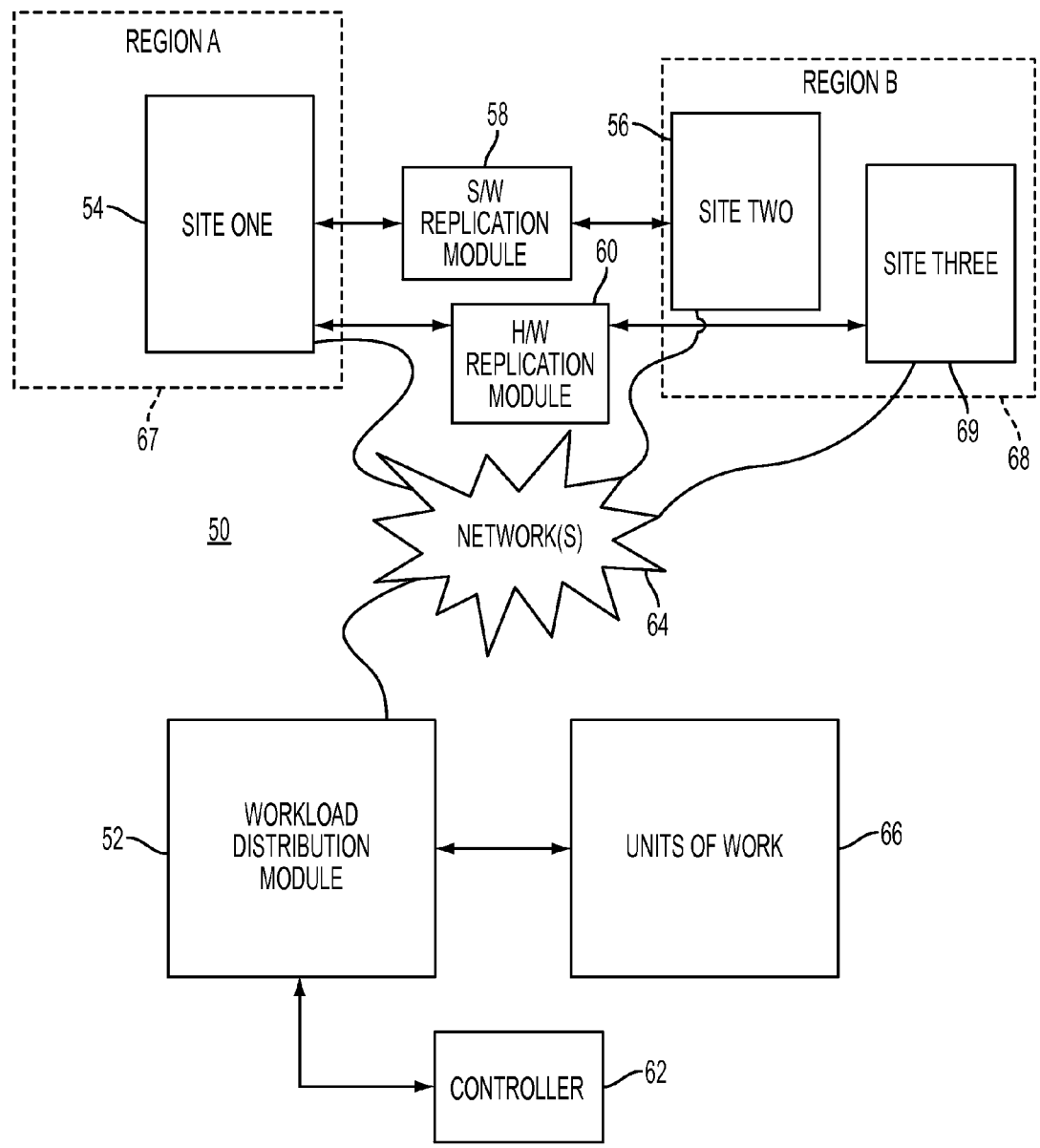
FIG. 4 illustrates a schematic diagram of an integral continuous/reliable availability system in accordance with an embodiment of the present invention.

With reference now to FIG. 4, an embodiment of the present invention may include an integrated continuous/reliable availability system 50 for implementing continuous availability for priority workloads and reliable availability for general workloads across multiple sites at unlimited distances. The system 50 may include a workload distribution module 52 executing computer instructions. The workload distribution module 52 may operate in any type of environment that is capable of executing a software application. For example, the workload distribution module 52 may include a high-speed, multiuser, multitasking computer processing device, such as a mainframe computer. In some embodiments, the workload distribution module 52 may be associated with an enterprise (e.g., a commercial business) that implements the integrated continuous/reliable availability across multiple sites at unlimited distances.

The integrated continuous/reliable availability depicted in FIG. 4 may include one or more computing sites, such as, for example, site one 54, site two 56 and site three 69. Each of the sites 54, 56, 69 may include one or more systems executing one or more workloads. The workloads may include transaction processing applications, database applications, queue and queue management operations, and the like. Each of the sites 54, 56, 69 may include, for example, one or more network hardware devices and/or software for managing and distributing network traffic.

Site one 54, site two 56 and site three 69 may be geographically distributed computing sites. For example, site one 54 may be located in one region, for example Region A 67, and site two 56 and site three 69 may be located in another region, for example, Region B 68, that is relatively geographically distant from Region A 67. The geographic distance between Region A 67 and Region B 68 may provide for a relatively high probability that computer processing sites in Region A 67 will not suffer outages, or otherwise become unavailable, at the same time as computer processing sites in Region B 68. In particular, the geographic distance between Region A 67 and Region B 68 may provide for a relatively high probability that computer processing sites in Region A 67 and sites in Region B 68 will not suffer outages, or otherwise become unavailable, due to a common cause, such as a regional power outage. In an alternative embodiment, site three 69 may be located in a third region that is relatively geographically distant from Region A 67 and from Region B 68.

The integrated continuous/reliable availability system 50 depicted in FIG. 4 additionally may include a software replication module 58 and a hardware replication module 60. The software replication module 58, which will be described in more detail below, may replicate data for priority workloads between site one 54 and site two 56. The hardware replication module 60, which also will be described in more detail below, may replicate data for storage units, including priority workload data and general workload data, such as disk replication, between site one 54 and site three 69. The integrated continuous/reliable availability system 50 further may include a controller 62, which may control the operation of the various components of the integrated continuous/reliable availability system 50, including, for example, the workload distribution module 52, which is described in more detail below.

The workload distribution module 52 and the sites 54, 56, 69 may be communicatively coupled via one or more networks 64. The networks 64 may be implemented using any type or combination of known networking device, including, but not limited to, a wide area network (WAN), a local area network (LAN), a global network (e.g., Internet), a virtual private network (VPN), an intranet and a telephone network. The networks 64 may be implemented using a wireless network or any kind of physical network implementation known in the art.

The sites, such as site one 54, site two 56 and site three 69 may be coupled to the workload distribution module 52 through multiple networks (e.g., intranet and Internet) such that not all of the sites are coupled to the workload distribution module 52 through the same network. The workload distribution module 52 may be implemented using one or more servers, for example, operating in response to a computer program stored in a storage medium accessible by the server.

In the integrated continuous/reliable availability system 50, units of work 66 initiated by users of the various systems or clients executing at the one or more sites may be distributed to one or more of the sites 54, 56, 69 through the workload distribution module 52. The units of work 66 may be transmitted from systems outside of the sites 54, 56, 69 and may be processed as workloads within one or more of the sites.

It will be readily understood by a person of ordinary skill in the art that the execution of continuous/reliable availability across multiple sites at unlimited distances system and methods described in FIG. 4 may be implemented as modules in hardware, software executing on general-purpose hardware, or a combination thereof. Although only three sites are depicted in FIG. 4, it will be further understood that, in an embodiment, any number of sites may be implemented, and that any geographic distance may separate the sites. Furthermore, although the workload distribution module 52 is depicted as existing outside of the sites, it will be readily understood by a person of ordinary skill in the art that, in an embodiment, the workload distribution module 52 may be directly located at one or more of the sites.

Figure 5:
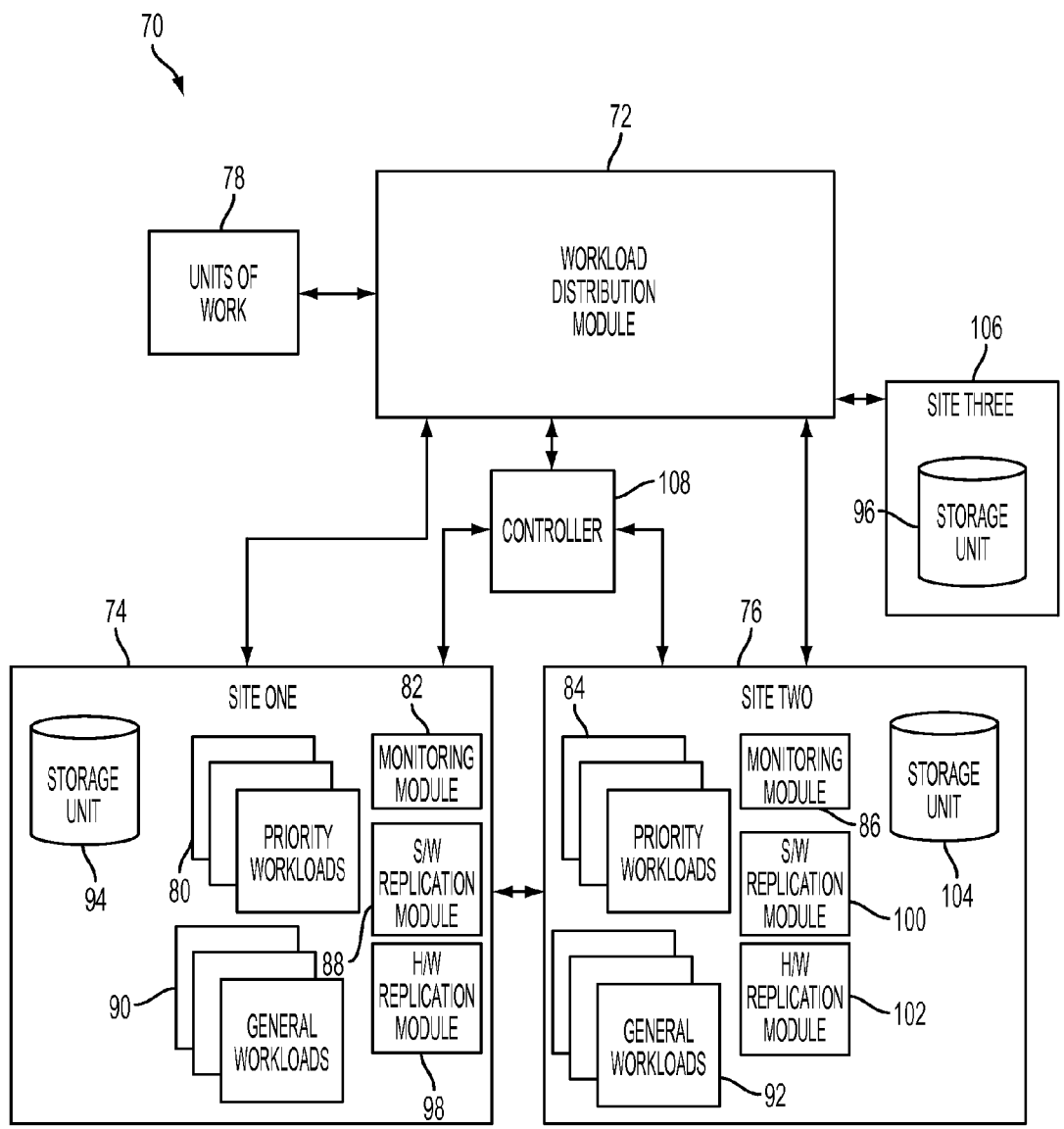
FIG. 5 illustrates a schematic diagram of the various components in an integral continuous/reliable availability system in accordance with an embodiment of the present invention.

FIG. 5 illustrates a schematic diagram of the various components in accordance with another embodiment of the invention. An integrated continuous/reliable availability system 70 includes a workload distribution module 72. In an embodiment, the workload distribution module 72 may collect metrics from multiple computing sites, for example, site two 76 and either site one 74 or site three 106. The metrics collected for each of the workloads may include, for example, processor speed, pending transactions, transaction execution time, system availability, network bandwidth utilization and availability, and any other performance-based metrics known in the art. The workload distribution module 72 may use the metrics in order to distribute one or more units of work 78 for one or more workloads to site one 74 and site two 76.

Individual units of work may be received or may be initiated at one of the site one 74 or site two 76. For example, in some embodiments site one 74 may include a computer system that is simultaneously or intermittently executing one or more priority workloads 80 and one or more general workloads 90. In other embodiments, site one 74 may include a group of servers, such as a server farm, operating on one or more workloads 80, 90 using local load balancing, or other methods of load distributing as is known in the art. In yet another embodiment, site one 74 may include multiple systems, each of which may execute one or more workloads 80, 90. In various embodiments, site one 74 may include a combination of servers and server farms each operating on one or more workloads.

In addition, site one 74 may include one or more monitoring modules, such as site one monitoring module 82. The site one monitoring module 82 may be communicatively coupled to the workload distribution module 72, such as through a network, and may transmit metrics from the site one 74 to the workload distribution module 72. In some embodiments, the site one monitoring module 82 may be executed on a single computer. In other embodiments, a monitoring module is executed on each of the systems executing at the site one 74. In yet other embodiments, multiple monitoring modules, one on each server, monitor and report metrics to the workload distribution module 72.

Furthermore, the site one monitoring module 82 may be configured to monitor the systems executing at site one 74. In some embodiments, the site one monitoring module 82 may be configured to monitor the available hardware processing capacity of the computer processors executing at the site one 74. In other embodiments, the site one monitoring module 82 may be configured to monitor the available network capacity of the site one 74. In yet other embodiments, the site one monitoring module 82 may be configured to monitor the one or more workloads 80, 90 executing at the site one 74.

In various embodiments, the site one monitoring module 82 may monitor various characteristics of the workloads 80, 90 such as the number of queued transactions, the availability of the workloads 80, 90 to handle additional transactions, the number of threads associated with each of the one or more workloads 80, 90, and any other workload-specific characteristics as is known in the art. Similarly, site two 76 may include a site two monitoring module 86, the operation of which may be analogous to that of the site one monitoring module 82.

In addition, site one 74 may include a software replication module 88, a hardware replication module 98, and a storage unit 94. Likewise, site two 76 may include a software replication module 100, a hardware replication module 102, and a storage unit 104. An additional storage unit 96 may be located at a third site, for example, site three 106.

The software replication modules 88, 100 may be configured to repeatedly or continuously replicate units of work, or unit of work data, from the priority workloads 80, 84 from the respective sites 74, 76. The software replication modules 88, 100 may collect units of work from the priority workloads 80, 84 and coordinate the replication of those units of work on the other site 76, 74 at relatively frequent intervals or periods, such as, for example, at a substantially real-time rate, in order to maintain the active and standby instances of a workload substantially synchronized. For example, the software replication modules 88, 100 may replicate unit of work data, such as logged transactional data, that is, logged data based on transactional boundaries, from the primary site, for example, site one 74, to the secondary site, for example, site two 76, subsequent to each transaction at the primary site. In various embodiments, the software replication modules 88, 100 may implement any suitable method of duplicating a workload instance, including, for example, program instructions, associated data and state information, such as IBM's InfoSphere Data Replication method.

The hardware replication modules 98, 102 may be configured to periodically replicate the contents of the storage units 94, 104 of the respective sites 74, 76, including priority workload data and general workload data. The hardware replication modules 98, 102 collect content from the storage units 94, 104 and coordinate the periodic replication of those contents on site three 106 at relatively less frequent intervals or periods, such as, for example, once every 5 seconds, once every 10 seconds, once every 30 seconds or once per minute. In an embodiment, the hardware replication modules 98, 102 may replicate contents of the storage units 94, 104 simultaneously with or immediately after each write function to the storage units 94, 104. In an embodiment, the hardware replication modules 98, 102 perform disk replication, copying or mirroring a complete image of a storage unit.

In various embodiments, the hardware replication modules 98, 102 may implement any suitable method of duplicating or mirroring a storage volume, image, or contents to a remote site, such as IBM's Metro Mirror peer-to-peer remote copy (PPRC), extended remote copy (XRC), or Global Mirror disk replication architectures, or the like. In various embodiments, the periodic hardware replication may be synchronous or asynchronous.

Multiple workloads may execute on separate sites, and each may be replicated to one or more other sites. For example, a priority workload 80 may execute on site one 74 and be replicated to site two 76, while another priority workload 84 executes on site two 76 and is simultaneously replicated on site one 74. In an embodiment, if the metrics for each workload indicate that one of the sites is overloaded, the workload distribution module 72 may distribute all units of work for that workload to another site. Of course, in various embodiments, any number of additional sites may be configured to provide load balancing and replication of units of work.

Although the controller 108 of FIG. 5 is depicted as a stand-alone module, it will be understood that, in various embodiments, the controller 108 may be executed in the workload distribution module 72 or in any combination of the sites 74, 76, 106. For example, in an embodiment, the controller 108 may communicate with each of the sites 74, 76, 106 and may be configured to coordinate transactions and replication of the units of work between the various sites. The controller 108 may communicate with the workload distribution module 72, and use information provided by each of those modules to coordinate transactions and replication of the units of work for each workload between the various sites.

The illustration of FIG. 5 is a simplified representation of the various components of the integrated continuous/reliable availability system 70 for purposes of clarity. It will be understood by those of ordinary skill in the art, that additional or fewer components may be used in alternate embodiments. In additional embodiments, the layout and configuration of the components may differ from those of FIG. 5 without affecting the functionality of the integrated continuous/reliable availability system 70. In additional embodiments, the various components may be located in separate modules. In further embodiments, the functionality of various components may be incorporated into a single hardware or software module.

FIG. 6A is a schematic diagram that illustrates a simplified multisite, multi-workload, integrated continuous/reliable availability system 110, including multiple geographically distributed computing sites, for example, Site A 112, Site B 114 and Site C 116. Site A 112 may be located in one region, for example Region 1 (not shown), and Site 114 and Site C 116 may be located in another region, for example, Region 2 (not shown), that is relatively geographically distant from Region 1. The geographic distance between Region 1 and Region 2 may provide for a relatively high probability that computer processing sites in Region 1 will not suffer outages, or otherwise become unavailable, at the same time as computer processing sites in Region 2. In particular, the geographic distance between Region 1 and Region 2 may provide for a relatively high probability that computer processing sites in Region 1 and sites in Region 2 will not suffer outages, or otherwise become unavailable, due to a common cause, such as a regional power outage.

In any embodiment, Site C 116 may be located in a third region, for example, Region 3 (not shown), that also is relatively geographically distant from Region 1. As above, the geographical distance between Region 1 and Region 3 may provide for a relatively high probability that computer processing sites in Region 1 and computer processing sites in Region 3 will not become unavailable at the same time or due to a common cause.

The primary computing site in this example, Site A 112, may host an active priority workload 118 and an active general workload 120. That is to say, the active priority workload 118 and an active general workload 120 may be assigned to Site A. The active priority workload 118 may be provided with continuous availability and workload redirection provisions, including software replication methods, because it is a priority workload. For example, a standby priority workload 122 may be executed in parallel on Site B 114. That is, the program instructions, associated data and state information of active priority workload 118 may be replicated from Site A 112 to Site B, for example, by the software replication module 58 of FIG. 4, and the priority workload program instructions may be simultaneously executed at Site A 112 and at Site B 114 as an active priority workload 118 and as a standby priority workload 122.

In addition, the active general workload 120 may be provided with reliable availability and workload redirection provisions, including managed hardware replication techniques, because it is a general workload. For example, the contents, or image, of a storage unit 126 at Site A (Image A), including the program instructions, may be periodically replicated to maintain a copy of the contents on a storage unit 132 at Site C (Copy A). The storage units 126, 128, 132 may include any type of computer memory medium organized in any format, such as, for example, a relational model database server, a hierarchical database, an information management system, a virtual storage access method server, a hard disk drive (HDD), optical storage medium, magnetic tape, or any other acceptable memory medium. A database may include, for example, any group of files organized in association with any database manager known in the art.

The software replication and hardware replication may be coordinated, or managed, by workload availability module 124, which may incorporate the functionality of the workload distribution module 52, the software replication module 58 and the hardware replication module 60 of FIG. 4, and may be communicatively linked with a controller 130. In any embodiment, the workload availability module 124 may communicate with the various sites via a network, such as the one or more networks 64 of FIG. 4. Thus, at any given moment in time, the contents of the storage unit 126 at Site A 112 may be backed up by a mirrored copy at a backup site, such as the storage unit 132 at Site C 116, which may be available in the case that Site A 112 should become unavailable.

The workload availability module 124 may be configured to detect that Site A 112 is unavailable, or that the active priority workload 118 is not executing on the primary site. In this case, as shown in FIG. 6B, workload availability module 124 may reassign and automatically redirect active priority workload 118 (i.e., transmit the ongoing/future data stream of active priority workload 118) to Site B 114, and designate the execution of the priority workload on Site B as the active priority workload 118. In various embodiments the redirection may occur, for example, within about 10 seconds, 30 seconds, one minute or 3 minutes. In various embodiments, the redirection of priority workloads may be fully automated, may require authorization by an operator, for example, based upon an operational policy, or may require initiation by an operator, for example, in the case of planned maintenance.

In any embodiment, workload redirection may occur because of an emergency or unplanned system or site outage, for example, based on metrics received from Site A 112. Alternatively, in an embodiment, the workload redirection may occur because of a planned system or site outage, for example, initiated by a program script and/or instructions from an operator.

In order to provide substantially continuous or near continuous secondary backup of the priority workload, the workload availability module 124 may restart the hardware replicated image at another available site, for example, bringing up Copy A from the storage unit 132 at site C 116. Thus, the workload availability module 124 may assign and replicate the active priority workload 118, for example, as standby priority workload 122 on Site C 116, as shown in FIG. 6C. Thus, during the time that Site A 112 is unavailable, the priority workload may continue to execute in parallel as an active priority workload 118 on Site B 114 and as a standby priority workload 122 on Site C 116.

At this point the contents of the storage unit 132 at Site C 116 (Image C) may actively support the standby priority workload 122 running at Site C 116, while continuing to maintain a residual copy of all data related to general workloads that previously were running at Site A 112 before Site A 112 became unavailable. Thus, the only period during which an active backup of priority workloads is not provided is the brief time required to replicate the active priority workload 118 from the original secondary site, Site B 114, to the new secondary site, Site C 116.

When a priority workload, such as active priority workload 118, is redirected from Site A 112 to Site B 114, the active general workload 120 may continue to execute on site A 112 unimpeded, if Site A 112 continues to be available. However, should workload availability module 124 detect that Site A 112 is unavailable, or that the active general workload 120 is not executing on the primary site, as shown in FIG. 6C, the workload availability module 124 may reassign the general workloads, for example, to Site C 116, and restart the active general workload 120 at Site C 116 from the hardware copy maintained in storage unit 132 at Site C 116.

The workload availability module 124 may synchronize data related to priority and general workloads in storage unit 132 at Site C 116 with that of storage unit 128 at Site B 114, for example, implementing software replication methods, to resolve any data inconsistencies such that the standby priority workloads and general workloads may become resynchronized with the active priority workloads, such as active priority workload 118, at disk integration. For example, the workload availability module 124 may resolve a data inconsistency by replacing data in storage 132 at Site C 116 related to a priority workload, such as priority workload 118, with corresponding data in storage 128 at Site B 114 based on the data in storage unit 132 at Site C 116 having become obsolete due to updates performed at Site B 116 but not at Site C 116 over time, for example, the period of time required to restart the active general workload 120 at Site C 116 from the hardware copy.

In various embodiments the redirection and restart of priority and general workloads from the hardware copy may occur, for example, within about two hours, within about one hour, or within about one-half hour. In various embodiments, the redirection of general workloads may be fully automated, may require authorization by an operator for example, based upon an operational policy, or may require initiation by an operator, for example, in the case of planned maintenance.

In addition, the workload availability module 124 may initiate replication of the contents (Image C) of storage unit 132 to another available site, for example, on storage unit 126 once Site A 112 becomes available again, as shown in FIG. 6D, in order to facilitate the eventual return to the original site configuration. In this scenario, the only period during which a hardware backup of general workloads would not be provided is the time during which Site A 112 is not available plus the time required to replicate the storage unit 132 contents (Image C) from the original hardware backup site, Site C 116, to the storage unit 126 at Site A 112 (Copy C).

In any embodiment, during the time that Site A 112 is unavailable, the contents (Image C) of storage unit 132 may also be periodically replicated at yet another site (not shown) in Region 1, Region 2, or another region that is relatively geographically distant from Region 3. The periodic hardware replication of storage unit 132 contents may provide reliable availability and facilitate the eventual return to the original site configuration. Thus, the only period during which a hardware backup of general workloads may not be provided is the time required to replicate the storage unit 132 contents (Image C) from the original hardware backup site, Site C 116, to a storage unit at a new secondary hardware backup site.

In FIG. 6D, Site B 114 has become the primary site for priority workloads, and Site C 116 has become the primary site for general workloads, as well as the secondary, or backup, site for priority workloads. The operative configuration of Site B 114 and Site C 116 in FIG. 6D may provide the full functionality, including software and hardware replication, of the original operative configuration of Site A 112 and Site B 114 in FIG. 6A. The active priority workload 118 may continue to execute indefinitely on Site B, and the active general workload 120 and the standby priority workload 122 may continue to execute indefinitely on Site C 116, while the image of storage unit 132 may be indefinitely periodically copied to storage unit 126 at Site A 112, or to a storage unit at yet another site while Site A is unavailable.

Nevertheless, after Site A 112 becomes available once again, for example, after maintenance or repairs have been performed, power has been restored, or the like, then the workload availability module 124 may reverse the migration process, or "go home," and return the operative configuration to the original operational configuration, such as, for example, a normal operation mode. The workload availability module 124 may replicate the contents (Image C) of the storage unit 132 at Site C 116 to the storage unit 126 at Site A 112 (Copy C) as shown in FIG. 6D.

As depicted in FIG. 6E, execution of workloads at the third site may be halted, and the workload availability module 124 may restart the priority workload as standby priority workload 122 at Site A 112. At this point the contents of the storage unit 126 at Site A 112 (Image A) may actively support the standby priority workload 122 running at Site A 112, while continuing to maintain a residual copy of all data related to general workloads running at Site C 116.

The workload availability module 124 may reassign and automatically redirect active priority workload 118 (i.e., transmit the ongoing/future data stream of active priority workload 118) to Site A 112, and once again designate the execution of the priority workload on Site A 112 as the active priority workload 118, returning to the original site configuration of FIG. 6A. Substantially simultaneously, workload availability module 124 may designate the execution of the priority workload on Site B 114 as the standby priority workload 122. In various embodiments the redirection may occur, for example, within about 10 seconds, 30 seconds, one minute or 3 minutes.

The workload availability module 124 may reassign the general workloads to Site A 112 and restart the active general workload 120 at Site A 112 from the hardware copy in storage unit 126 at Site A 112, as shown in FIG. 6A. The workload availability module 124 may synchronize data related to priority and general workloads in storage unit 132 at Site A 112 with that of storage unit 128 at Site B 114, for example, implementing software replication methods, to resolve any data inconsistencies such that the standby priority workloads and general workloads may become resynchronized with the active priority workloads, such as active priority workload 118, at disk integration. For example, the workload availability module 124 may resolve a data inconsistency by replacing data in storage 126 at Site A 112 related to a priority workload, such as the active priority workload 118, with corresponding data in storage 128 at Site B 114 based on the data in storage unit 126 at Site A 112 having become obsolete due to updates performed at Site B 116 but not at Site A 112 over time, for example, the period of time required to restart the active general workload 120 at Site A 112 from the hardware copy.

The contents (Image A) of the storage unit 126 at Site A 112, may once again be periodically replicated to maintain a copy of the contents (Copy A), for example, on the storage unit 132 at Site C 116. At this point, Site A 112, Site B 114 and Site C 116 may all have been returned to the original operative configuration of FIG. 6A. In various embodiments, the reverse migration, that is, the redirection and restart of priority and general workloads from the hardware copy, may require approximately three hours, approximately one hour, or approximately 30 minutes.

In various embodiments, the workload availability module 124 may perform the reverse migration, or "go home," procedures based on automated programming scripts and/or user instructions. For example, in an embodiment, the workload availability module 124 may restore the original operative configuration upon detecting that the primary site is once again available. In an embodiment, the reverse migration must be initiated by a user, or operator.

The operative configurations of the priority and general workloads, sites and storage units of FIG. 6A-6E are provided for purposes of clarity, and a person of ordinary skill in the art will readily understand that in alternate embodiments any number of sites and workloads may be implemented in any combination, and that the sequence of operational configuration transitions may be performed in a variety of different orders to accomplish continuous/reliable availability. Similarly, a person of ordinary skill in the art will readily apprehend that a similar sequence of operational configuration transitions may be performed in the case of a secondary site unavailability, such as an outage of Site B 114 of FIG. 6A.

FIG. 7 illustrates a block diagram of an individual site 140 associated with an integral continuous/reliable workload availability module 142 in accordance with an embodiment of the invention. The workload availability module 142 may incorporate the functionality of the workload distribution module 52, the software replication module 58 and the hardware replication module 60 of FIG. 4, and may be communicatively coupled to a controller 164 and to one or more workloads executing at the site 140. The workload availability module 142 may coordinate distribution of units of work for the active priority workload 144. Each the active priority workload 144 and the active general workload 146 may include an application interface 148, 150 that may facilitate communication of units of work to the active priority workload 144, the active general workload 146, or both.

The application interfaces 148, 150 may be configured to use any type of application interface known in the art, such as, for example, TCP/IP, message queuing, remote procedure execution, or any other suitable interface. Each the active priority workload 144 and the active general workload 146 additionally may include a transaction and data storage unit 152, 154. In one embodiment, the transaction and data storage units 152, 154 may include, for example, a database storage system. In another embodiment, the transaction and data storage units 152, 154 may include a file-based system. In yet another embodiment, the transaction and data storage units 152, 154 may include a transaction-based storage such as a queue. In other embodiments, the transaction and data storage units 152, 154 may be any storage as is known in the art.

The active priority workload 144 additionally may be associated with a workload monitoring module 156. In The workload monitoring module 156 may monitor the performance of the workloads and the system processing load. The workload monitoring module 156 may be configured to determine the transaction processing speed of the workloads, the number of threads executing for each workload, the number of transactions queued for processing, and/or any other workload processing related information. The workload monitoring module 156 may be communicatively coupled to a monitoring module, such as the site one monitoring module 82 of FIG. 5, which may transmit the workload metrics to the workload availability module 142.

The active priority workload 144 and the active general workload 146 may further include system state monitors 160, 162. The system state monitors 160, 162 may communicate to the workload availability module 142 whether or not the active priority workload 144 and the active general workload 146 are currently operating within specified tolerances. When either the active priority workload 144 or the active general workload 146 should stop operating correctly, the system state monitors 160, 162 may notify the workload availability module 142.

FIG. 8 illustrates a process flow for providing integral continuous/reliable availability in accordance with an embodiment of the invention. At block 170, statistical data and metrics may be collected for each workload from the various applications and sites. In an embodiment, the statistical data and metrics are collected continuously at a substantially real-time rate. At block 172, a unit of work may be received for a workload. The unit of work may be associated with either a priority workload or with a general workload. A unit of work may include one or more transactions that are connected with one another. In an embodiment, the unit of work includes a series of updates and/or inserts in a relational database and the unit of work is defined by a first transaction, and terminated by a commit request, which closes the group of transactions and stores them in a database. In another embodiment, a logical unit of work may include a series of transactions across multiple backend systems, each dependent on one another.

At block 174, a workload distribution module, such as workload distribution module 72 of FIG. 5, may use the network addressing for the unit of work to determine with which workload the unit of work is associated. At block 176, the particular site that will be used to execute the unit of work may be determined and the unit of work may be assigned to the site based on the workload determined at block 174, and the metrics collected at block 170.

In an embodiment, the site may be selected based on whether or not the site is the primary site for executing the workload that the unit of work is directed to, on the available processing capacity, the available network bandwidth, the average transaction execution speed, the number of pending transactions, the availability of a site, and/or any other factor as is known in the art. In another embodiment, the site may be selected iteratively in a "round-robin" fashion. In yet another embodiment, the site may be selected randomly from a group of available sites.

In an embodiment, if one site is unavailable, such as where a network becomes unavailable, a power outage is encountered or a hardware failure exists, the site may be automatically removed from consideration until the issues have been corrected. In an additional embodiment, if the workload is unavailable, for example, because of a system error or a scheduled outage, the workload is directed to an alternate site that is capable of processing the workload.

At block 178, the unit of work may be transmitted to the selected site. At block 180, a system within the site may be selected to process the work. In some embodiments, a plurality of systems at each site may be configured to process a unit of work. At block 182, the unit of work may be transmitted to the selected system. At block 184, the unit of work may be executed by the selected system at the selected site, and the transactions in the unit of work may be committed and stored in a database.

At block 186, once the transactions have been executed, the unit of work data may be replicated, for example, if the unit of work is associated with a priority workload, to the other site that supports the same workload environment using a software replication module such as each of the software replication modules 88, 100 of FIG. 5. In various embodiments, the replication may be synchronous or asynchronous. In an additional embodiment, the unit of work data may be replicated in its entirety to multiple alternate sites using software replication methods.

At block 188 each of the transactions in the unit of work may be committed to each of the alternative sites, for example, by a software replication module, and executed at each of the alternate sites in a way that maintains data consistency. Technical effects and benefits of software replication include a mechanism for load balancing, workload redirection, and replication of data associated with one or more workload across a number of sites separated by unlimited distances without requiring workload changes.

At block 190, the content, image or data maintained in a storage unit, such as, for example, a hard disk drive, at the primary site may be replicated, or mirrored, in its entirety, or substantially in its entirety, for example, to a storage unit at a third site that is geographically distant from the primary site. In an alternative embodiment, the data may be replicated from the primary site to more than one other site. In another embodiment, the data copy at the third site may be replicated to one or more other sites.

FIG. 9 illustrates an additional process flow for providing integral continuous/reliable availability in accordance with an embodiment of the invention. At block 192, metrics or statistical data regarding the primary computing site may be monitored to verify correct operation of the primary site. At block 194, a determination may be made as to whether or not the primary site is available. If not, in block 196 a failover procedure may be performed, for example, according to FIG. 10. If the primary site is available, the active priority workloads may be assigned to and executed at the primary site in block 198.

In block 200, the standby priority workloads may be executed at the secondary site, and in block 202 priority workload data may be replicated, for example, using software replication techniques from the primary site to the secondary site. The active general workloads may be assigned to and executed at the primary site in block 204, and in block 206, the storage unit data maintained in a storage unit at the primary site may be replicated to a storage unit at a third site, for example, using hardware replication techniques.

FIG. 10 illustrates a failover procedure that may be used with the process flow for providing integral continuous/reliable availability of FIG. 9. In the event that the primary site is not available, in block 210, the active priority workloads may be switched over to execute at the secondary site. For example, the standby instances of priority workloads executing at the secondary site may be designated as and become the primary, or active, instances of the priority workloads. The switchover may be requested by a user, operator or system administrator, or automated according to a policy implemented, for example, in programming script. In various embodiments, the switchover may require approximately 10 seconds, 30 seconds, one minute or three minutes.

In block 212, the standby priority workloads may be reassigned to and restarted at a third site from a hardware copy, implementing software replication methods with the second site in order to maintain continuous availability for the priority workloads. For example, the priority workloads previously executing at the primary site may be restarted at the third site as standby instances using dormant instances copied to the mirrored storage volume at the third site by a hardware replication method before the primary site became unavailable. The restart may be requested by a user, operator or system administrator, or automated according to a policy implemented, for example, in programming script.

In block 214, the active general workloads may be restarted at the third site. For example, the general workloads previously executing at the primary site may be reassigned to and restarted at the third site using dormant instances copied to the mirrored storage volume at the third site by a managed hardware replication method before the primary site became unavailable. The restart may be requested by a user, operator or system administrator, or automated according to a policy implemented, for example, in programming script. In various embodiments, the restart of priority and general workloads may require approximately three hours, approximately one hour, or approximately 30 minutes.

In block 216, data related to priority and general workloads at the third site may be synchronized with the current active priority workload data, for example, implementing software replication methods. For example, data in a storage unit at the third site used by priority or general workloads may be synchronized with corresponding data in a storage unit at the original secondary site to resolve any data inconsistencies, for example, resulting from data at the third site having become obsolete due to updates performed at the original secondary site but not at the third site during the period of time required to restart the priority and general workloads from the hardware copy at the third site, such that the priority and general workloads at the third site may become resynchronized with the priority workloads at the original secondary site. The data used by general workloads generally may include, for example, batch application files, sequential files, flat files, state information, other files that do not log data, non-logged data objects, or the like.

A determination may be made, in block 218, as to whether or not the primary site is currently available. If the primary site remains unavailable, the process may wait at block 218 until the primary site becomes available once again. In block 220, the contents or data copy maintained in a storage unit at the third site may be replicated to the original primary site using hardware replication methods.

At block 222, an operator input may be monitored for a "restore" command. At block 224, a determination may be made as to whether or not the restore command has been received. If the restore command has been received, at block 226, a restore procedure may be performed, for example, according to FIG. 11. However, if the restore command has not been received in block 224, the procedure may return to block 218.

A person of ordinary skill in the art will readily understand that this method reduces the potential disruption of computing services, and reduces the exposure time during which priority workloads may operate at a single site without continuous backup resulting from a failure to the time required to restart workloads from the mirrored storage volume.

FIG. 11 illustrates a restore, or reverse migration, procedure that may be used with the process flow for providing integral continuous/reliable availability of FIG. 9 and the failover procedure of FIG. 10. In block 230, data related to priority and general workloads at the original primary site may be synchronized with the current active priority workload data from the secondary site, for example, implementing software replication methods. For example, data in a storage unit at the original primary site used by priority or general workloads may be synchronized with corresponding data in a storage unit at the secondary site to resolve any data inconsistencies, for example, resulting from data at the original primary site having become obsolete due to updates performed at the secondary site but not at the original primary site during the period of time required to restart the priority and general workloads from the hardware copy at the original primary site, such that the priority and general workloads at the original primary site may become resynchronized with the active priority workloads at the secondary site. The data used by general workloads generally may include, for example, batch application files, sequential files, flat files, state information, other files that do not log data, non-logged data objects, or the like.

The standby priority workloads may be reassigned to and restarted at the primary site from a hardware copy, in block 232, implementing software replication methods with the second site in order to maintain continuous availability for the priority workloads. For example, execution of workloads at the third site may be halted, and the primary workloads that were executing at the third site may be restarted at the original primary site using dormant instances copied to the mirrored storage volume at the primary site from the third site by a hardware replication method. In an embodiment, the restart must be requested by a user, operator or system administrator, or automated according to a policy implemented, for example, in programming script.

The general workloads may be restarted at the original primary site in block 234. For example, the general workloads executing at the third site may be restarted at the primary site using dormant instances copied to the mirrored storage volume at the primary site by a hardware replication method. In a preferred embodiment, the restore procedure must be commanded by a user, operator or system administrator. In various embodiments, the restart of priority and general workloads at the original primary site may require approximately three hours, approximately one hour, or approximately 30 minutes.

In block 236, the active priority workloads and the standby priority workloads may be switched, or swapped. For example, the standby instances of priority workloads that were restarted at the primary site in block 230 may be designated and become the primary, or active, instances of the workloads, returning primary execution of the priority workloads to the primary site, and the priority workloads executing at the original secondary site may once again be designated as standby instances. This switchover may be performed under planned, controlled conditions at a time selected to be convenient to the operator. In a preferred embodiment, the restore procedure must be commanded by a user, operator or system administrator. In various embodiments, the switchover may require approximately 10 seconds, 30 seconds, one minute or 3 minutes.

In block 238, the content or data maintained in a storage unit at the original primary site may be periodically replicated to another storage unit, for example, at the third site using hardware replication methods.

A person of ordinary skill in the art will readily understand that the methods of FIGS. 9-11 reduce the exposure time during which priority workloads may operate at a single site without continuous backup during the restore procedure to the time required to restart workloads from the mirrored storage volume at the primary site.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A system for providing reliable availability of a general workload and continuous availability of a priority workload over long distances, comprising:
   a first computing site configured to execute a first priority instance associated with the priority workload and to execute a first general instance associated with the general workload, wherein the first priority and general instances are designated as active instances and wherein the priority workload is distinct from the general workload;

a second computing site configured to execute a second priority instance of the priority workload, wherein the second priority instance is designated as a standby instance;

a third computing site configured to execute a third priority instance of the priority workload and to restart a second general instance of the general workload from a hardware copy of a storage volume of the first computing site maintained in a storage volume of the third computing site when the first computing site becomes unavailable; and a workload availability module configured to designate the second priority instance as the active instance and the third priority instance as the standby instance upon detecting that the first computing site is unavailable, wherein the workload availability module synchronizes, during a period of time required by the restart of the second general instance, a portion of data associated with the second priority instance with a corresponding portion of data associated with the third priority instance based on the portion of data associated with the third priority instance being obsolete due to updates performed at the second computing site, and wherein the workload availability module reduces an exposure time of the priority workload operating at a single site without continuous backup during the period of time required by the restart of the second general instance from the hardware copy of the storage volume of the first computing site.

2. The system of claim 1, further comprising a hardware replication module configured to replicate an image from the storage volume of the first computing site to a copy on the storage volume of the third computing site.

3. The system of claim 2, wherein the third computing site is further configured to restart the third priority instance, and the workload availability module is further configured to synchronize a portion of data associated with the second general instance with a corresponding portion of data associated with the first general instance.

4. The system of claim 1, wherein the workload availability module is further configured to monitor a metric associated with a first processor and determine whether the first processor is unavailable based at least in part on the monitoring of the metric.

5. The system of claim 1, wherein the second computing site is separated from the first computing site by a first distance greater than a metropolitan area network, and the third computing site is separated from the first computing site by a second distance greater than the metropolitan area network.

6. A computer program product for providing reliable availability of a general workload and continuous availability of a priority workload over long distances, the computer program product comprising a non-transitory computer readable storage medium having stored thereon:

first program instructions executable by a processor to cause the processor to assign a first priority instance associated with the priority workload to a first computing site and to assign a first general instance associated with the general workload to the first computing site, wherein the priority workload is distinct from the general workload and wherein the first priority and general instances are designated as active instances;

second program instructions executable by the processor to cause the processor to assign a second priority instance associated with the priority workload to a second computing site, wherein the second priority instance is designated as a standby instance;

third program instructions executable by the processor to cause the processor to assign a third priority instance of the priority workload to a third computing site and to restart a second general instance of the general workload from a hardware copy of a storage volume of the first computing site maintained in a storage volume of the third computing site when the first computing site becomes unavailable;

fourth program instructions executable by the processor to cause the processor to designate the second priority instance as the active instance and the third priority instance as the standby instance upon detecting that the first computing site is unavailable; and fifth program instructions executable by the processor to cause the processor to synchronize, during a period of time required by the restart of the second general instance, a portion of data associated with the second priority instance with a corresponding portion of data associated with the third priority instance based on the portion of data associated with the third priority instance being obsolete due to updates performed at the second computing site, wherein the synchronizing reduces an exposure time of the priority workload operating at a single site without continuous backup during the period of time required by the restart of the second general instance from the hardware copy of the storage volume of the first computing site.

7. The computer program product of claim 6, the non-transitory computer readable storage medium further having stored thereon fifth program instructions executable by the processor to cause the processor to replicate an image from the storage volume of the first computing site to a copy on the storage volume of the third computing site.

8. The computer program product of claim 6, the non-transitory computer readable storage medium further having stored thereon:

sixth program instructions executable by the processor to cause the processor to restart the third priority instance; and seventh program instructions executable by the processor to cause the processor to synchronize a portion of data associated with the second general instance with a corresponding portion of data associated with the first general instance.

9. The computer program product of claim 6, the non-transitory computer readable storage medium further having stored thereon:

sixth program instructions executable by the processor to cause the processor to monitor a metric associated with the first processor; and seventh program instructions executable by the processor to cause the processor to determine the first processor is unavailable based on the metric.

10. A method for providing reliable availability of a general workload and continuous availability of a priority workload over long distances, comprising:

executing a first priority instance associated with the priority workload at least in part with a first processor and a first general instance associated with the general workload at least in part with the first processor, wherein the first priority and general instances are designated as active instances and wherein the priority workload is distinct from the general workload;

executing a second priority instance associated with the priority workload at least in part with a second processor, wherein the second priority instance is designated as a standby instance;

determining the first processor is unavailable;

executing a third priority instance associated with the priority workload at least in part with a third processor;

restarting a second general instance of the general workload from a hardware copy of a storage volume associated with the first processor maintained in a storage volume associated with the third processor;

designating the second priority instance as the active instance and the third priority instance as the standby instance; and synchronizing, during a period of time required by the restart of the second general instance, a portion of data associated with the second priority instance with a corresponding portion of data associated with the third priority instance based on the portion of data associated with the third priority instance being obsolete due to updates performed by the second processor, wherein the synchronizing reduces an exposure time of the priority workload operating at a single processor without continuous backup during the period of time required by the restart of the second general instance from the hardware copy of the storage volume associated with the first processor.

11. The method of claim 10, further comprising replicating an image from the storage volume associated with the first processor to a copy on the storage volume associated with the third processor.

12. The method of claim 11, further comprising:

restarting the third priority instance; and synchronizing a portion of data associated with the second general instance with a corresponding portion of data associated with the first general instance.

13. The method of claim 10, further comprising:

monitoring a metric associated with the first processor; and determining the first processor is unavailable based on the metric.

14. The method of claim 10, wherein the second processor is separated from the first processor by a first distance greater than a metropolitan area network, and the third processor is separated from the first processor by a second distance greater than the metropolitan area network.

\* \* \* \* \*